US010784805B1

United States Patent
Bojoi et al.

(10) Patent No.: US 10,784,805 B1
(45) Date of Patent: Sep. 22, 2020

(54) SYSTEM AND METHOD FOR INTERIOR PERMANENT MAGNET SYNCHRONOUS MOTOR CONTROL FROM ZERO OR LOW SPEED

(71) Applicant: Wolong Electric Group Co. Ltd., Zhejiang (CN)

(72) Inventors: Radu Bojoi, Turin (IT); Zheng Zhang, Saint Joseph, MI (US); Ze Jiang, Zejiang (CN)

(73) Assignee: Wolong Electric Group Co. Ltd., Zejiang (CN)

( * ) Notice: Subject to any disclaimer, the term of this patent is extended or adjusted under 35 U.S.C. 154(b) by 0 days.

(21) Appl. No.: 16/795,074

(22) Filed: Feb. 19, 2020

(51) Int. Cl.
*H02P 21/34* (2016.01)
*H02P 21/13* (2006.01)
*H02P 21/22* (2016.01)
*H02P 21/18* (2016.01)

(52) U.S. Cl.
CPC .......... *H02P 21/34* (2016.02); *H02P 21/13* (2013.01); *H02P 21/18* (2016.02); *H02P 21/22* (2016.02); *H02P 2203/11* (2013.01)

(58) Field of Classification Search
CPC .............................. H02P 21/34; H02P 21/18
USPC ................ 318/400.02, 400.01, 700
See application file for complete search history.

(56) References Cited

U.S. PATENT DOCUMENTS

| 7,116,077 | B2 * | 10/2006 | Raftari | B60W 20/50 318/798 |
| 7,334,854 | B1 | 2/2008 | Chang et al. | |
| 7,999,496 | B2 * | 8/2011 | Gleason | B60W 10/02 318/139 |
| 8,796,974 | B2 | 8/2014 | Wang et al. | |
| 9,331,618 | B2 * | 5/2016 | Sonoda | H02P 21/32 |
| 9,915,517 | B2 * | 3/2018 | Feuersaenger | H02P 27/04 |

OTHER PUBLICATIONS

Guglielmi, P., et al., "Cross-Saturation Effects in IPM Motors and Related Impact on Sensorless Control", IEEE Tran. Ind. Applicat., vol. 42, No. 6, pp. 1516-1522, Nov./Dec. 2006.
Bojoi, R., et al., "Sensorless Control of PM Motor Drives—a Technology Status Review", Proc. of the 2013 IEEE Workshop on Electrical Machines Design, Control and Diagnosis, (WEMDCD), Paris, 2013, pp. 166-180.

(Continued)

*Primary Examiner* — David Luo
(74) *Attorney, Agent, or Firm* — Warner Norcross + Judd LLP

(57) ABSTRACT

A system and method for robust control of a sensorless interior permanent magnet synchronous motor. The system and method includes rotor characteristic detection to detect or estimate rotor position, rotor speed, and rotor magnetic polarity based on rotor magnetic anisotropy or saliency. Detecting rotor magnetic polarity allows determination of orientation of the rotor and, for a rotor in motion, direction of travel. A high frequency injection enables rotor position detection and an alternating carrier method enables detection of rotor magnetic polarity. The system and method can also include closed loop startup control from a standstill condition following detection of rotor characteristics.

19 Claims, 14 Drawing Sheets

(56) References Cited

OTHER PUBLICATIONS

Bianchi, N., et al., "Comparison of PM Motor Structures and Sensorless Control Techniques for Zero-Speed Rotor Position Detection", IEEE Tran. Power Electron., vol. 22, No. 6, pp. 2466-2475, Nov. 2007.
Holtz, J., "Acquisition of Position Error and Magnet Polarity for Sensorless Control of PM Synchronous Machines", IEEE Trans. on Industry Applications, vol. 44, No. 4, Jul./Aug. 2008.
Fatu, M., et al. "I-F Starting Method with Smooth Transition to EMF Based Motion-Sensorless Vector Control of PM Synchronous Motor/Generator", IEEE Power Electronics Specialists Conference (PESC), 2008, pp. 1481-1487.
Agarliță, S.-C., et al., "I-f Starting and Active Flux Based Sensorless Vector Control of Reluctance Synchronous Motors, with Experiments", 12th International Conference on Optimization of Electrical and Electronic Equipment (OPTIM), 2010, pp. 337-342.
Brandstetter, P., et al., "Sensorless Control of Permanent Magnet Synchronous Motor Using Voltage Signal Injection", Elektronika IR Elektrotechnika, ISSN 1392-1215, vol. 19, No. 6, 2013, pp. 19-24.
Kang, J., "Sensorless Control of Permanent Magnet Motors", Control Engineering, vol. 57, No. 4, Apr. 2010, pp. 1-4.

\* cited by examiner

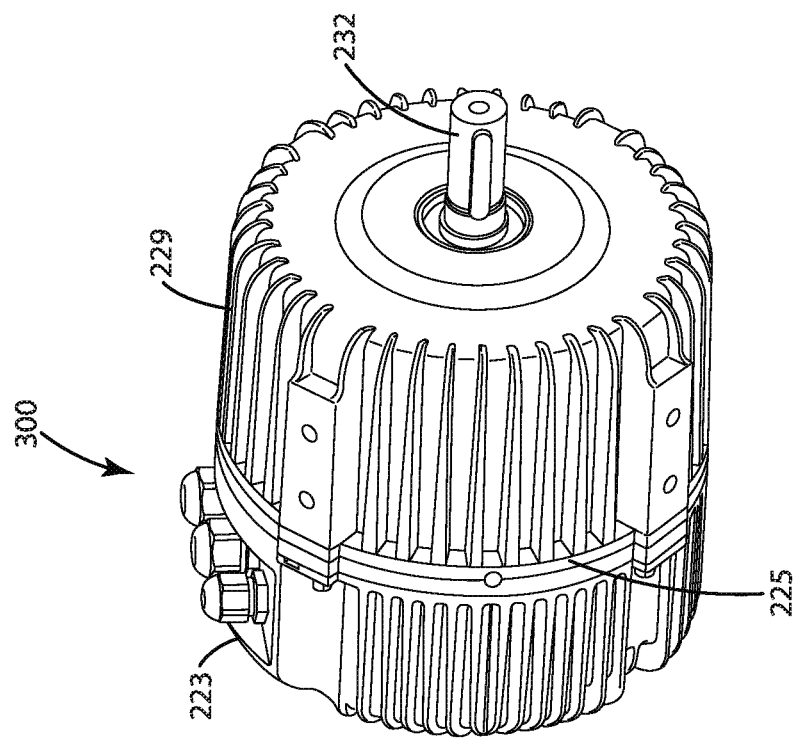
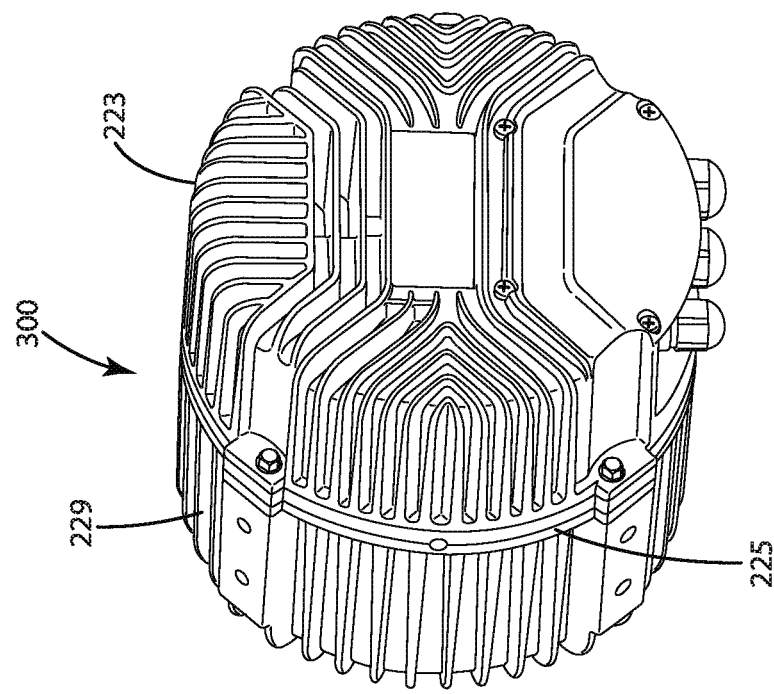
Fig. 3A
Fig. 3B

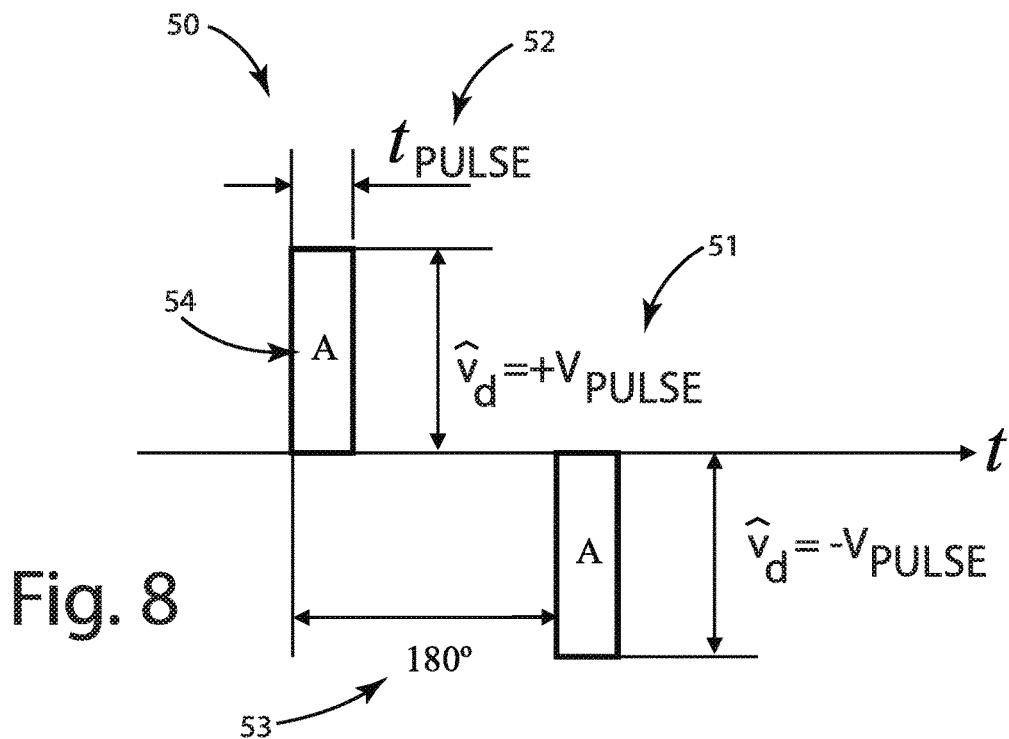
Fig. 8
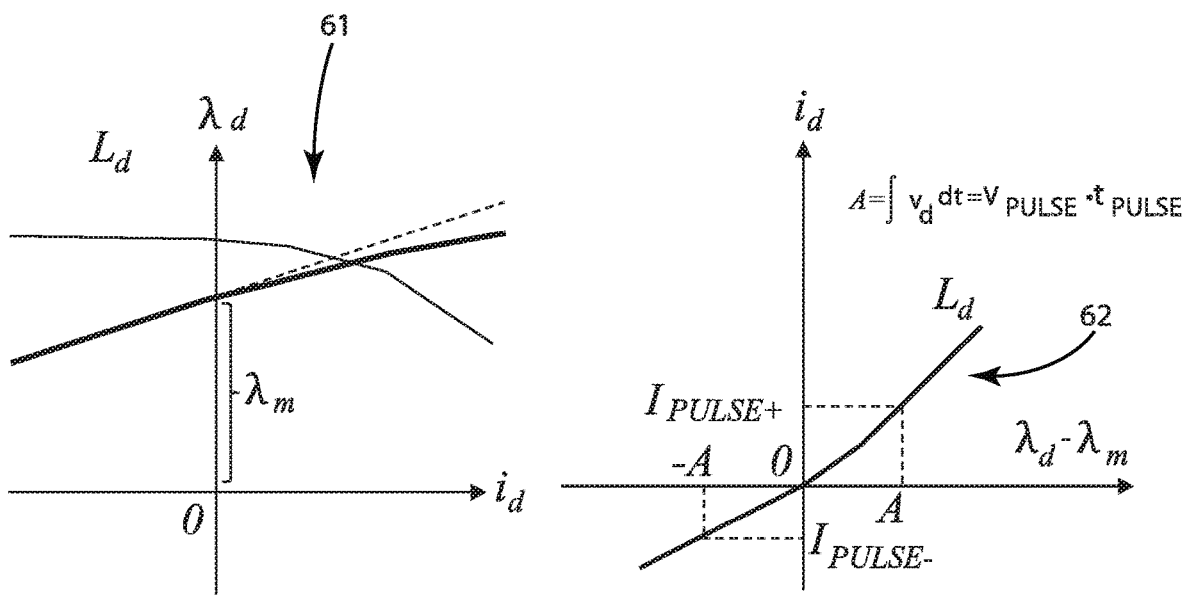
Fig. 9A
Fig. 9B

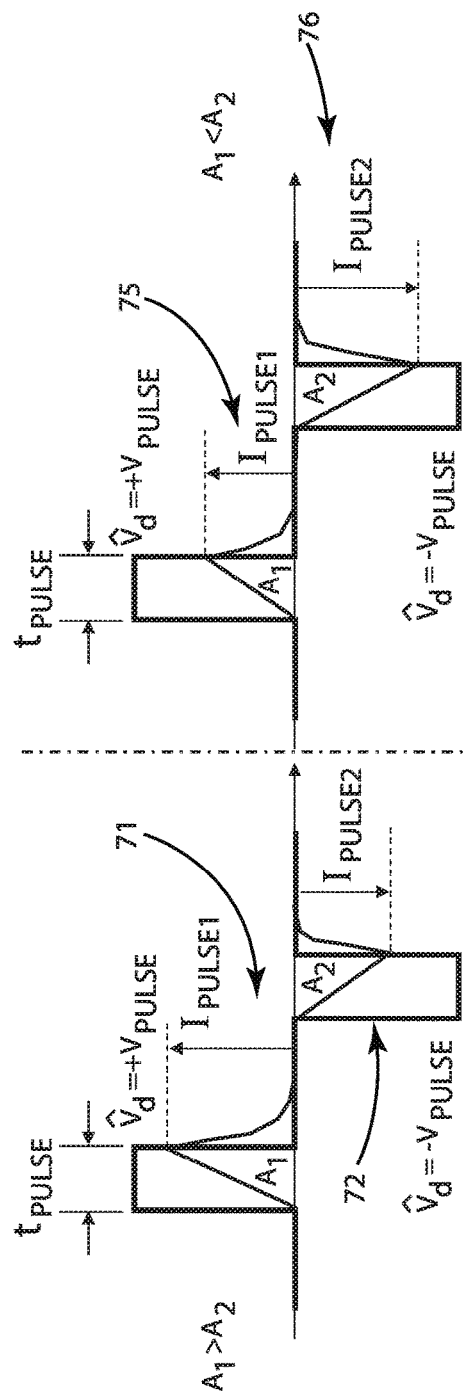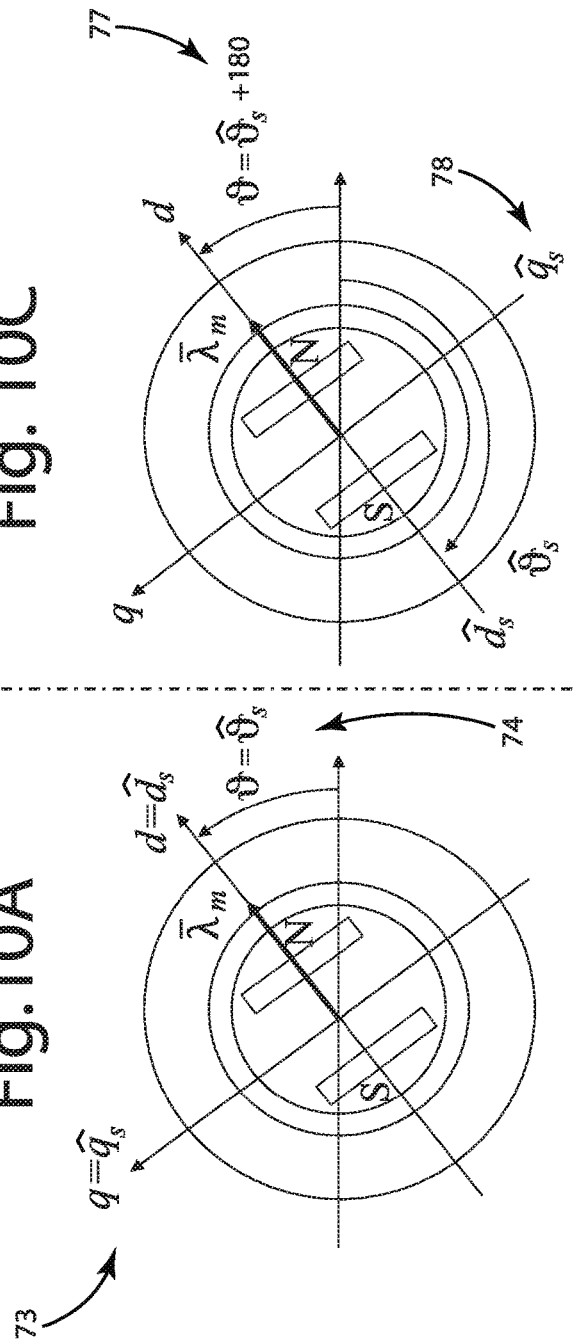
Fig. 10A  Fig. 10C
Fig. 10B  Fig. 10D

SYSTEM AND METHOD FOR INTERIOR PERMANENT MAGNET SYNCHRONOUS MOTOR CONTROL FROM ZERO OR LOW SPEED

BACKGROUND OF THE INVENTION

The present invention relates to control of interior permanent magnet motor systems, for example as utilized in connection with commercial blower and fan driving applications. Certain embodiments relate to a robust starting control method that is effective to start a permanent magnet synchronous motor regardless of operational conditions in the field, including rotation in either direction, rotating at a low motor speed, or from zero motor speed.

As a new generation of electronic motor control technologies have been developed over the past decade, sensorless based Permanent Magnet Synchronous Motor (PMSM) systems have begun being utilized in commercial fan and blower driven applications. These sensorless motors can deliver not only high peak efficiency at the rated working speed, but also a large high-efficiency operational speed range. In addition, variable speed operation allows the system to operate under a low capacity during the off-peak period, such as nighttime, which allows HVAC systems to achieve high energy savings.

One drawback of sensor based PMSM systems is their speed and/or position sensor. That is, sensor-based PMSM systems use a speed and/or position sensor external to the motor (e.g., mounted to the motor shaft), which takes up space, adds cost in the form of additional electronics, and is an additional fault point that detracts from the reliability of the motor. Instead of incorporating external sensors, sensorless PMSM systems rely on sensing operating characteristics of the motor itself for control. Sensorless PMSM control generally involves utilizing estimated values, such as estimated motor speed and/or estimated rotation angle, to replace control values directly measured with external sensors in sensor based PMSM systems.

Sensorless PMSM systems typically eliminate external sensors, such as motor encoders and hall-effect sensors, without significantly detracting from performance. Some efforts have been made to overcome the lack of direct speed/position sensors with improved motor control methodology, for example by deriving rotor position and speed information from measured stator voltage and currents in combination with open-loop estimators or closed-loop observers based on a mathematical model of the motor. To increase clarity, a sensorless motor refers to the lack of a mechanical structure coupled with the motor rotor physically to directly detect position, such as a hall effect sensor or motor encoder, and does not preclude sensors generally. For example, known sensorless motors with closed loop estimators may still include sensors for measuring stator currents and voltages in the motor controller, which can be used indirectly in estimating stator position. There are a number of advantages to sensorless PMSM systems such as reduced hardware complexity, lower cost, reduced size, cable elimination, increased reliability, and decreased maintenance. Such systems can also be preferable in hostile environments and high speed applications. However, there is room for improvement in the current implementations of sensorless PMSM systems, which can struggle to provide robust and efficient motor control in commercial blower and fan driving applications.

Known sensorless PMSM control methods can generally be classified into two main types, those that rely on back electromotive force (back-EMF) and those that rely on signal injection. Back-EMF methods estimate the back-EMF generated by rotation of the motor under fundamental excitation for position and speed estimation. Signal injection methods typically utilize high frequency signal injection or other excitation in addition to the fundamental excitation to track the spatial saliency image of the rotor to extract position information. Both of these types of techniques commonly derive rotor speed information from measured stator voltages/currents in combination with open-loop estimators or closed-loop observers based on a mathematical model of the motor.

At standstill, the rotor speed is zero (or near zero) and therefore the back-EMF is zero (or low enough to be unreliably distinguishable from noise). This makes the back-EMF methods generally unsuitable for controlling the motor from a standstill condition to operating speed. Some small motor applications attempt to overcome this issue through use of a braking system (to try and ensure the motor is stopped) and an open loop control to ramp the motor speed to a point where the back-EMF is reliable. This is not desirable in many situations, such as commercial blower and fan applications, where the braking system may not be able to reliably hold the rotor at zero speed. Signal injection methods are typically more appropriate for zero and near-zero speed operation, or any low speed range at which the flux observer is not able to establish accurate position information for closed loop control. However, they also suffer from several drawbacks in this role.

Unlike back-EMF sensorless motor control methods, signal injection sensorless motor control methods rely on the permanent magnet motor saliency. Accordingly, frequency injection typically only works with motors that exhibit magnetic saliency, such as an interior permanent magnet synchronous motor (IPMSM). In an IPMSM the permanent magnets are not attached on the surface of the rotor, but instead are embedded in the rotor. For an IPMSM, because the permanent magnets have lower permeability than the rotor material, the effective air gap in the magnetic flux path varies according to rotor position. This is referred to as magnetic saliency or motor saliency and it causes variation in the inductance at the stator based on rotor position, which in turn causes variations in the stator currents. Accordingly, by monitoring characteristics of the stator during the frequency injection, rotor position and rotor speed can be estimated.

Unlike a traditional three-phase AC induction motor, permanent magnet synchronous motor (PMSM) driven systems typically utilize a special starting method. Starting the permanent magnet motor rotor is a challenge for sensorless PMSM systems because when the motor is in a standstill condition (e.g., at zero speed or low speed) typical sensorless methods for estimating rotor position and speed are unreliable. For example, while back-EMF is generally proportional to the motor speed, meaningful voltage information for back-EMF starting methods can be difficult to detect when the motor is at zero or low speeds because the back-EMF may be indistinguishable from noise at those levels. Starting from an unknown rotor position and speed may cause a starting failure or temporary reverse motor rotation. Accordingly, conventional sensorless motors typically only handle simple situations at startup. For example, one simplistic solution involves stopping or parking the motor in a known position, operating the motor in an open loop control mode to ramp up until an observer is able to read the back-EMF feedback to detect the rotor position and switch the motor to closed loop control mode. Techniques have been developed to improve this "catch up" style starting methodology over the years. While these techniques can be effective in small power permanent magnet motors, they are not well suited for commercial fans and blowers. For commercial fans and blowers, the wing size may be large, resulting in a large inertia, which usually leads to rotor oscillations or difficulty to reach a zero-speed condition. Sometimes the natural wind-run force to the wings is too large to hold the rotor by braking, which causes these opened-loop starting methods fail in commercial fan drive applications.

As mentioned above, signal injection methods that rely on magnetic saliency are sometimes used in PMSM systems. These methods do not typically have the same problem detecting rotor position/speed at zero or low speeds. This has a significant impact on the detection of rotor position with signal injection. In addition, known signal injection methods do not determine rotor magnetic polarity. A more robust and advanced method for sensorless motor control, including control at startup, is desirable.

SUMMARY OF THE INVENTION

The present invention provides a system and method for robust control of a sensorless motor, such as an interior permanent magnet synchronous motor. The system and method include startup control of a motor using closed loop control from a standstill condition, including zero motor speed or a low motor speed range. A rotor characteristic detection method includes in accordance with one embodiment of the present invention, a signal injection method that can detect certain rotor characteristics, such as rotor position, rotor speed, and rotor magnetic polarity, of a motor exhibiting rotor magnetic anisotropy or saliency. The rotor characteristic detection method may include a rotor polarity detection method. The rotor polarity detection method can include an alternating carrier method.

The rotor characteristic detection method can not only accurately detect the rotor position and rotor speed, but also the magnetic polarity of the rotor permanent magnets. Motor control based on rotor position and rotor speed without understanding the magnetic polarity of the rotor can lead to startup issues, such as, unexpected vibration, noises, etc. By including a rotor polarity detection method in a rotor characteristic detection method, the magnetic polarity of the motor can be utilized in the startup control methodology, which can provide a more robust and efficient startup. In one embodiment, the polarity detection method can be performed with two voltage pulses where the rotor position, including rotor magnetic polarity, is the one for which the pulse current has a higher value. The voltage-second amplitude of the pulse injection can be set sufficiently high to saturate the motor when the voltage pulse is applied along the magnet axis, which can be estimated with a high frequency injection or other method. Depending on the injection characteristics and the particular motor, the rotor position, including rotor speed and rotor magnetic polarity, can be obtained efficiently and accurately, for example in some embodiments in less than 0.5 seconds.

Once the initial rotor position, including rotor speed and magnetic polarity, is detected, the motor controller can be configured to perform a startup motor control method where the motor controller controls the speed of the motor directly from zero or a low speed using a closed loop control algorithm conducted by an advanced motor control method, such as the direct flux control (DFC) method.

Including rotor polarity detection as part of a rotor characteristic detection method increases the robustness of the method and can be useful in improving startup motor control. The rotor characteristic detection method can detect rotor position at both zero motor speed and very low motor speeds (a few RPM, e.g., −10 to 10 RPM or −5 to 5 RPM) in the clockwise or counterclockwise rotating direction. By using this rotor characteristic detection method in combination with an appropriately advanced motor control method, a secure motor starting process for commercial fan or blower applications can be provided for the standstill state. For example, robust and efficient startup is available to commercial fans or blowers that suffer from wind-run in either the clockwise or counter-clockwise direction.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 3A-B illustrate assembled front and rear perspective views of the PMSM of FIG. 2.

FIG. 8 illustrates exemplary voltage pulses for a magnetic polarity detection method, showing pulse amplitude, width, and positions.

FIG. 9A illustrates a direct magnetic model, showing inductance decreases as the current increases.

FIG. 9B illustrates an inverse magnetic model showing the inductance increases.

FIGS. 10A and 10B illustrate detection of magnet polarity according to the peak values of the current pulses where the signal injection method detects the magnet polarity in the d-axis.

FIGS. 10C and 10D illustrate detection of magnet polarity according to the peak values of the current pulses where the HFI method detects the magnet polarity in the negative d-axis.

DESCRIPTION OF THE CURRENT EMBODIMENT

Figure 1B:
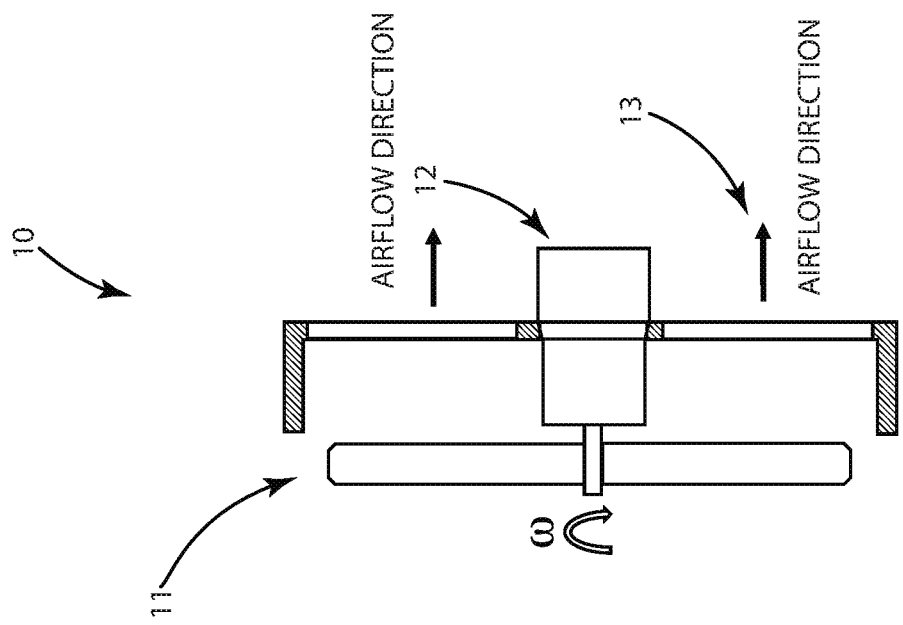
FIG. 1 illustrates a commercial fan or blower diagram in operation showing the rotating fan wings and the airflow direction prior to motor startup.
Figure 1A:
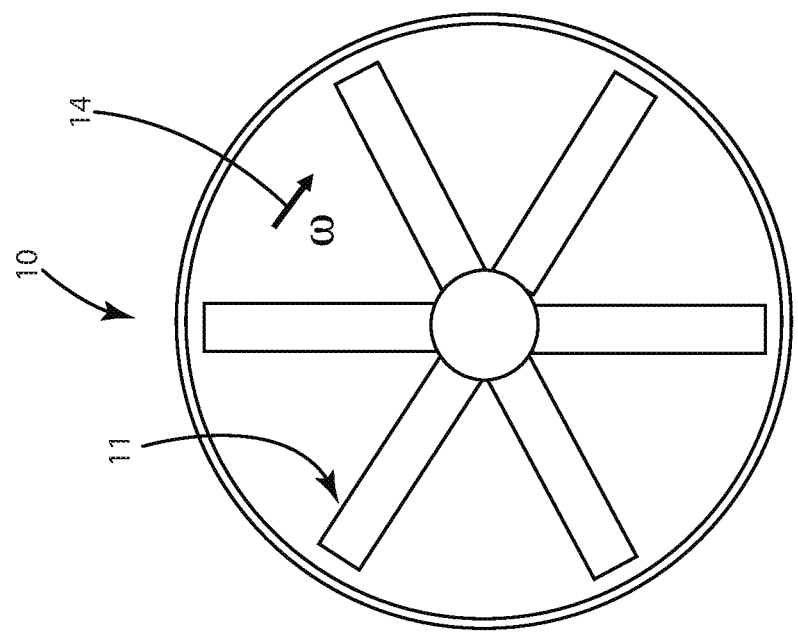

FIGS. 1A and 1B illustrate front and side diagrammatic views of an exemplary commercial fan structure 10. The figures show exemplary elementary components including fan blades 11, a permanent magnet synchronous motor (PMSM) 12, and the axial airflow direction 13. When the fan blades 11 are driven by the PMSM to run at a certain speed and rotating direction 14, the blades generate a pressure to push the airflow through the fan 13. When driven by the PMSM 12, the fan can produce the specified airflow to satisfy an airflow requirement based on the configuration or programming of the motor electronics, typically incorporated within the motor itself. The blades 11 can also rotate without power due to natural wind mobility, referred to as wind-run. The wind-run rotating direction can be clockwise or counter-clockwise, and is more-or-less random.

Figure 2:
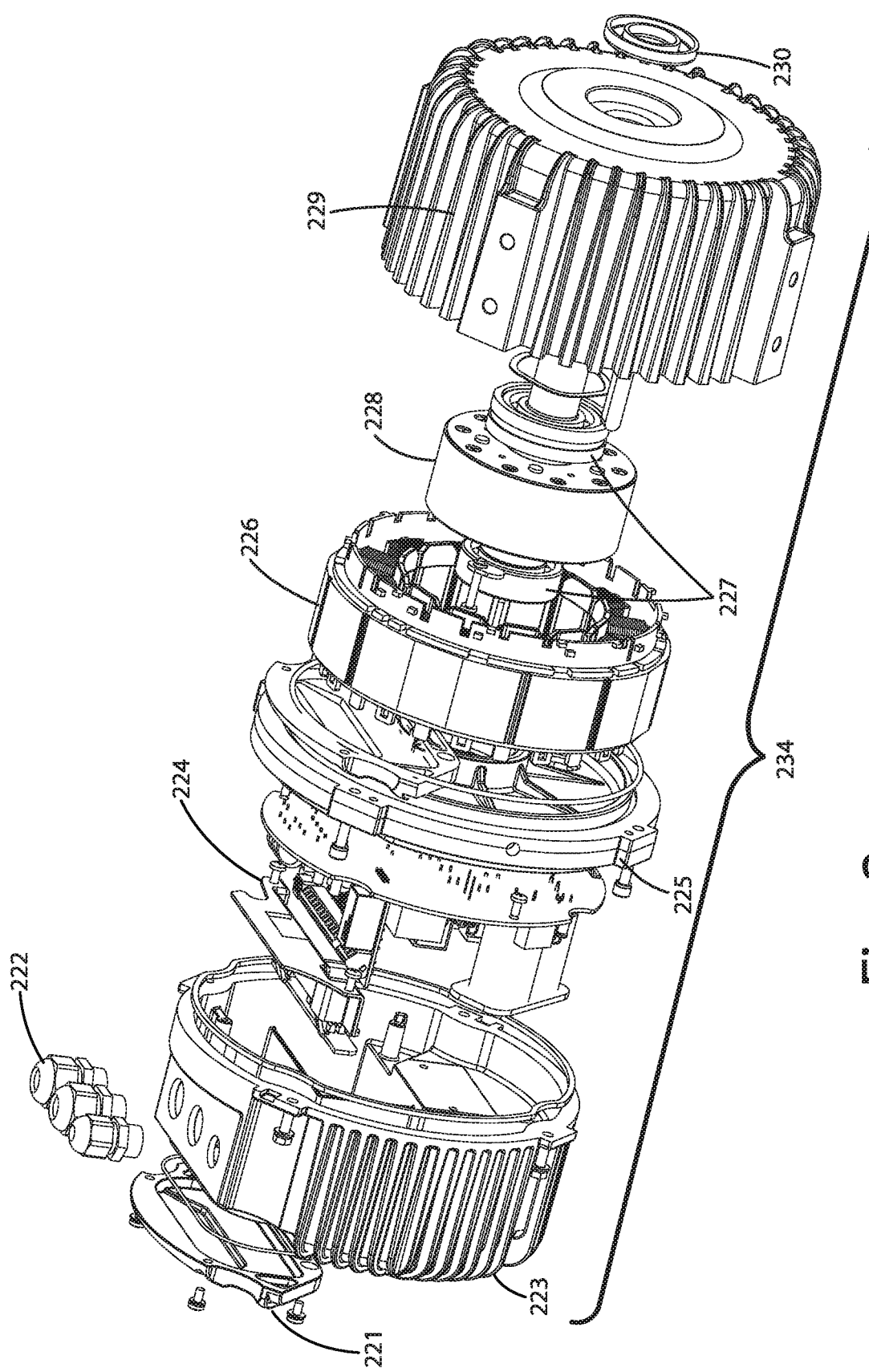
FIG. 2 illustrates an exploded view of an PMSM in accordance with one embodiment of the present invention.

FIG. 2 illustrates an exploded view of one embodiment of a PMSM 12, while FIG. 3A illustrates a rear view of the PMSM 12 and FIG. 3B illustrates a front, shaft-side, perspective view of the PMSM 12. The depicted embodiment of the motor 12 has a housing or enclosure 234 that includes a rear-end shield 223, a front-end shield 229 and mid shield 225. The three shields are joinable to cooperatively form an enclosure 300 of the PMSM 12. The rear-end shield 223 and the mid shield 225 form a sealed enclosure for the PMSM electronics including a motor control system 224. A lubricant seal 230 can surround the drive shaft 232 that extends out of the motor enclosure 234 and seal the front-end shield 229. In alternative embodiments, the motor enclosure can be formed from additional, fewer, or different constituent components that cooperate the house the motor in essentially any suitable way that enables the motor 12 to convert electrical energy into mechanical energy, for example to rotate the drive shaft.

The motor 12 of the current embodiment includes a motor control system 224, a stator 226, and a rotor 228. The motor control system 224 may be mounted and sealed within a separate cavity in the motor, for example via cooperation of the rear sealed end-shield 223 and the sealed mid-shield 225. The motor control system 224 is capable of driving multi-phase AC electromagnetics of the stator 226 to create a magnetic field that rotates in time with the oscillations of the line current. Once at steady state, the rotor, for example via permanent magnets embedded in the rotor, turns in step with the stator 226 and as a result rotates the drive shaft 232 of the stator. The motor may include bearings 227 that support and locate the rotor to keep the air gap between the stator 226 and the rotor 228 small and consistent. A waterproof electrical connection 222 for routing, connecting, or otherwise coupling power to the motor control system 224 and stator 226. A wire cover 221 may be secured or integrally formed with the rear-end shield 223.

Figures 7A, 7B:
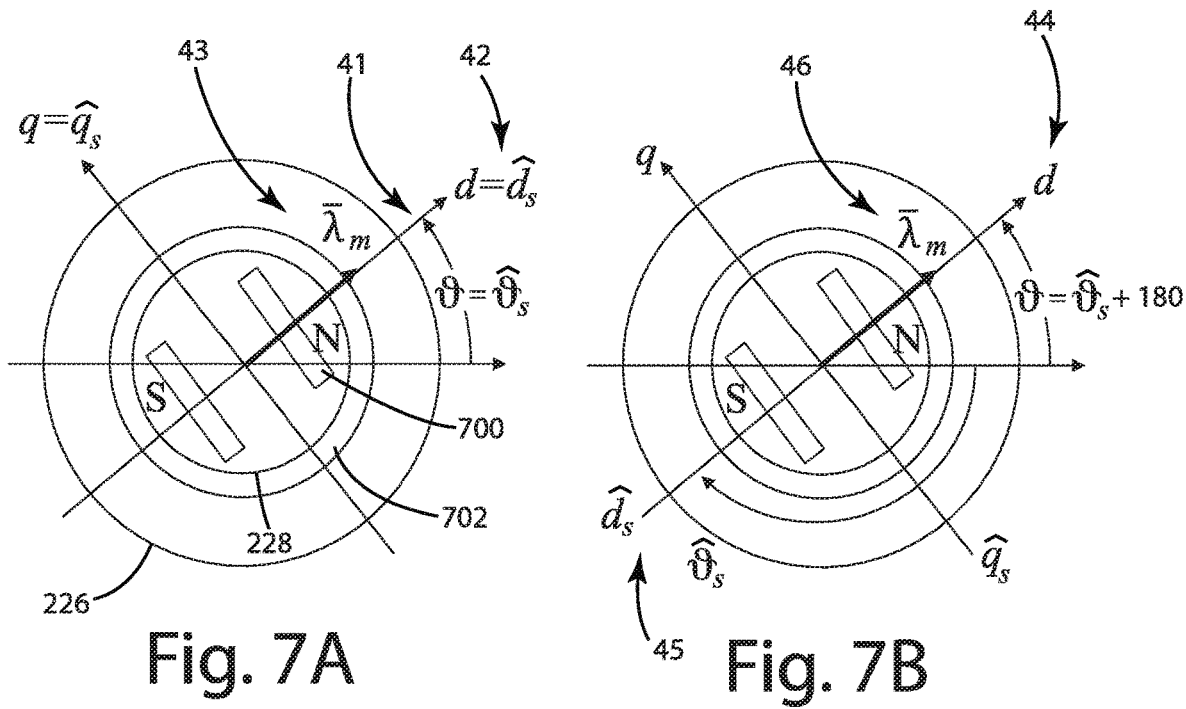
FIGS. 7A and 7B illustrate two possible outcomes of a signal injection method.

In the illustrated embodiments of the present invention, the motor is an interior permanent magnet synchronous motor (IPMSM). A typical interior permanent magnet motor rotor structure, such as that of the current embodiment, has characteristics of magnetic saliency, i.e., the motor inductances (d,q) are not equal. One exemplary IPMSM motor is illustrated in FIGS. 7A-B. Permanent magnets 700 are embedded in the rotor 228 and there is an air gap 702 between the rotor 228 and the stator 226. The stator includes windings 35 that can be powered by the motor control system 224 to generate a rotating magnetic field around the airgap 702. Essentially any IPM motor configuration can be implemented where the magnets are arranged such that the motor inductances are not equal. Although the depicted embodiment includes two magnets, other arrangements with additional magnets are suitable that provide non-equal motor inductances (d,q).

The configuration, arrangement, and selection of PMSM components in the embodiment depicted in FIGS. 1-3A and 3B are exemplary. Alternative embodiments can have additional, different, or fewer components. For example, although the current embodiment is described within the context of the depicted PMSM motor, other embodiments can be implemented that using another type of sensorless brushless permanent magnet motor (BPM), sensorless electrically commutated motor (ECM), sensorless vector controlled motor system, or other type of sensorless variable speed motor construction and configuration.

An exemplary embodiment of the motor control system 224 will now be discussed in detail. Generally speaking, the motor control system 224 may include one or more microcontrollers, microprocessors, and/or other programmable electronics that are programmed to carry out the functions described herein. The motor control system 224 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the motor 12, or they may reside in a common location within the motor 12, such as within the sealed enclosure formed by the rear-end shield 223 and the mid-shield 225. When physically distributed, the components may communicate using any suitable serial or parallel communication protocol, such as, but not limited to SCI, WiFi, Bluetooth, FireWire, I2C, RS-232, RS-485, and Universal Serial Bus (USB).

Figure 4:
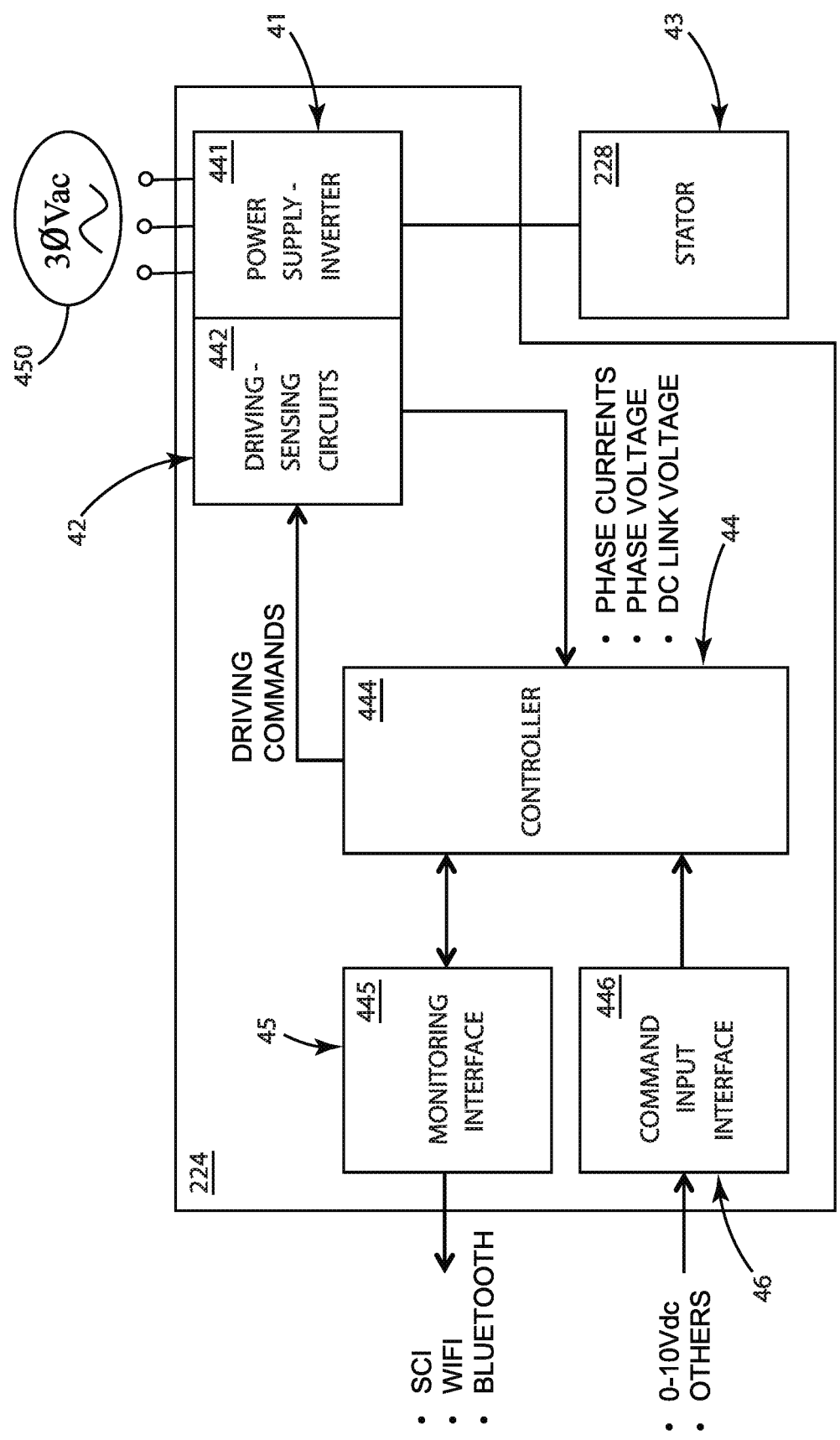
FIG. 4 illustrates a block diagram in accordance with one embodiment of the present invention.

Referring to FIG. 4, one embodiment of the motor control system 224 includes a combination of a variety of different electronic components, including, but not limited to, power supply circuitry 441 to convert source power 450 to a suitable voltage, current, and frequency, driving circuitry 442 to drive the motor stator windings based on driving commands, sense circuitry 442 to sense one or more motor characteristics for use in the one or more motor control methodologies, a controller 444 to implement one or more motor control methodologies and provide driving commands to the driving circuitry based on the sensed motor characteristics, a monitoring interface 445 for monitoring motor operation including the one or more motor control methodologies, and a command input interface 446 for providing various command inputs to the controller 444.

Driving and sensing circuitry 442 and power supply circuitry 441 for carrying out various known motor control methodologies are well known and therefore will not be described in detail. The driving and sensing circuitry 442 used to implement various embodiments of the rotor characteristic detection method described herein, including embodiments of the high frequency injection rotor position and speed detection methods and rotor polarity detection methods described herein, can be the same driving and sensing circuitry 442 utilized to implement other known rotor position detection methods or rotor speed detection methods. For example, the driving and sensing circuitry can include three-phase full bridge topology, along with sensing circuitry capable of detecting various stator characteristics, such as stator phase currents and stator voltages. In one embodiment, the sensing circuitry is capable of detecting stator phase currents, stator phase voltages, and DC link voltage. That is, known hardware configurations of the driving and sensing circuitry 442 can be utilized to implement embodiments of the rotor characteristic detection method described herein. In alternative embodiments, the sensing circuitry 442 may include circuitry to sense additional, different, or fewer characteristics.

The controller 444 can include memory, or have access to memory located on a shared circuit board or located elsewhere within the motor. The memory can contain various operating parameters in connection with the rotor characteristic detection method. For example, the memory may include one or more look-up-tables, such as the values depicted graphically in FIG. 14, which are discussed in more detail herein.

The controller 444 can be configured with a rotor characteristic detection method. That is, the software, programming, and/or logic on the controller can be configured with a rotor characteristic detection method that includes the following sub-methods:

1) a rotor position detection method that detects the position of the rotor based on the magnetic saliency of the motor, such as a signal injection method. The signal injection method can be one of the signal injection methods described herein or an alternative, known, signal injection method. The rotor position detection can also include detecting rotor speed.

2) a rotor polarity detection method that detects the polarity of the rotor based on the magnetic anisotropy of the motor, such as a pulse signal injection method.

The pulse signal injection method of one embodiment includes applying out of phase voltage pulses to the stator and identifying the rotor polarity based on the stator current response, which can be referred to as an alternating carrier method.

Detecting rotor position with a rotor position detection method refers to detecting or estimating the position of the rotor relative to the motor stator. The position can be obtained or translated to essentially any suitable coordinate system. For example, one embodiment of a high frequency signal injection method includes translating stator current measurements during or after the high frequency injection into rotor position in terms of radians, as shown in FIGS. 16A-D.

Rotor speed can be detected during the rotor position detection method. For example, by detecting or estimating rotor position over time, rotor speed can be detected or estimated.

Rotor magnetic polarity can be detected utilizing a rotor polarity detection method. One embodiment of the rotor polarity detection method includes applying two voltage pulses on the d-axis aligning to the motor rotor position, one positive and one negative. Put simply, the two pulses are shifted 180 degrees out of phase with each other—that is the second voltage pulse waveform is shifted in time equal to half the first voltage pulse's period. After initiating injection of the first voltage pulse into the stator a first stator current response is sensed by the sensing circuitry. The response can be sensed as an integral of the current $A_1$, for example the integral of current over the full period of the voltage pulse waveform or a portion thereof, such as the positive pulse width portion (mark) or the negative pulse width portion (space). The response can be sensed alternatively or in addition by sensing a peak stator current $I_{pulse1}$, such as the peak stator phase current during the first voltage pulse. After initiating injection of the second voltage pulse into the stator a second stator current response is sensed by the sensing circuitry. The second stator current response can be measured in a similar manner to the first stator current response, such as by measuring an integral $A_2$ or peak phase current $I_{pulse2}$, including the peak stator phase current during the second voltage pulse. The rotor polarity detection method compares the current response, for example the peak stator phase currents or current integrals, during the first and second voltage pulse to detect whether the rotor is in a first orientation or a second orientation that is rotated 180 degrees about the motor shaft axis.

Referring to FIG. 4, the controller 444 can handle control of a sensorless PMSM including both startup and steady-state operation. The controller 444 can control the stator 228 according to one or more different control schemes, such as field orientation control (FOC), direct torque control (DTC), or direct flux control (DFC).

The controller can be configured to select between different starting control strategies depending on a variety of different factors. For example, perhaps as best understood with reference to FIG. 5, the controller can select an appropriate control strategy based on whether the motor characteristic detection method detects a standstill condition, a positive wind-run condition, or a negative wind-run condition. The controller can detect rotor position and rotor speed, for example utilizing a high frequency injection method, can detect rotor polarity, for example utilizing a rotor polarity detection method, determine the current condition of the rotor (e.g., standstill, positive wind-run, or negative wind-run), and then select a suitable control methodology accordingly, for example based on a pre-set mapping between rotor condition and control methodology.

Figure 5:
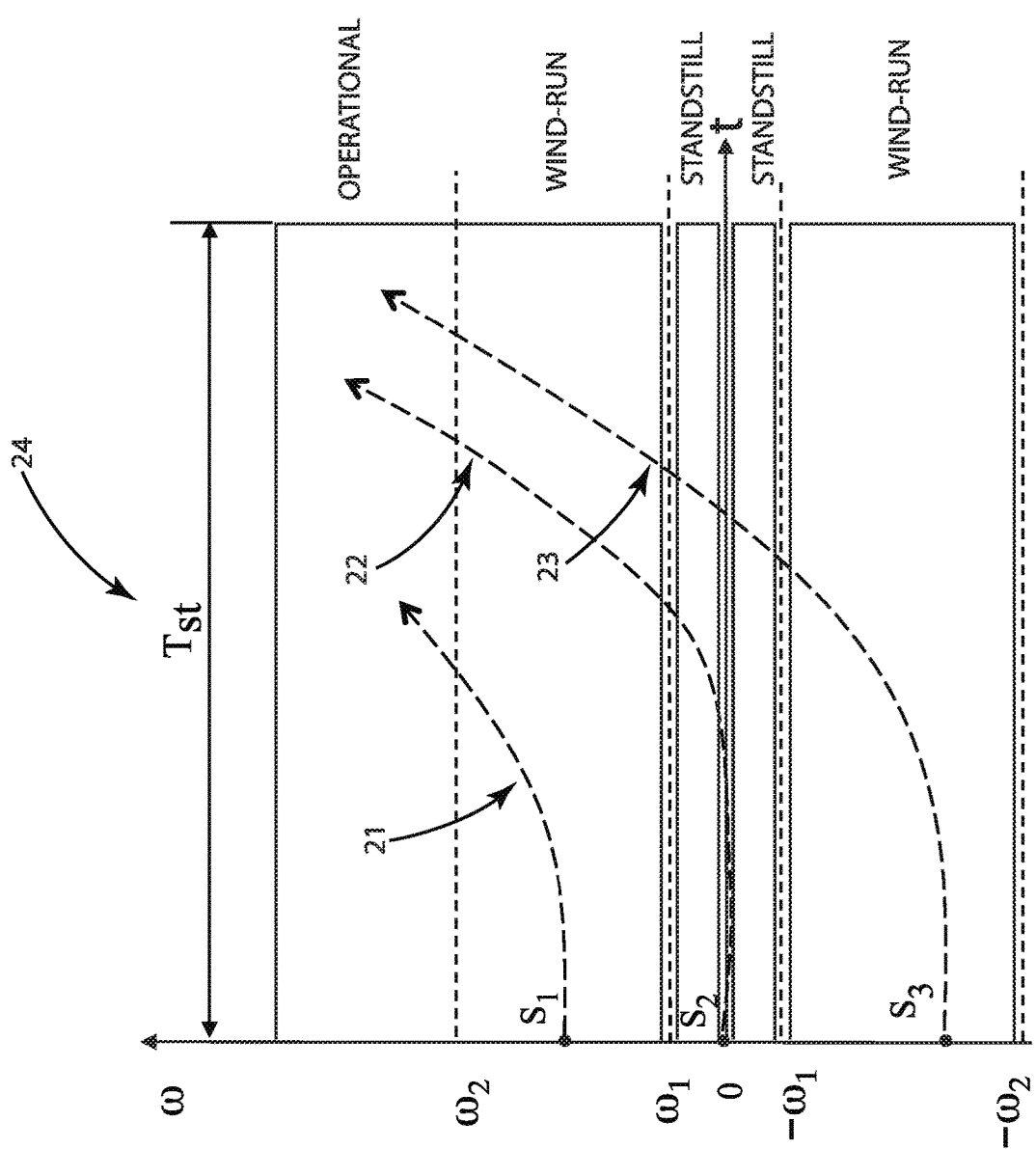
FIG. 5 illustrates exemplary starting modes for sensorless control of a PMSM for a commercial fan application.

The motor controller can also be configured to seamlessly transition between multiple control methods depending on a variety of factors. For example, the controller 444 may be configured to use a first control method at startup (such as an HFI method) when the motor is in a standstill condition, then in response to detecting a different motor condition (such as where the rotor characteristic detection method estimates exceeding a threshold value such that a flux or other type of observer can generate reliable signals), the controller 444 can switch to use a second control method (such as DFC and apply the now-reliable estimates from the flux observer to ramp the motor speed to steady state in the operational speed zone). That is, the controller 444 can be configured such that when the speed is very low or even at zero speed to use rotor speed and/or rotor position estimates from a special, start-up rotor characteristic detection method that provides reliable rotor position and/or rotor speed estimates at low or zero motor speed, then after the motor reaches a sufficient speed using a special, start-up motor control method, the motor can transition to another control methodology, better suited for normal operation. The controller can also be configured to account for rotor polarity in its start-up motor control method, for example by selecting from a plurality of different motor control methods (e.g., a method suited for positive wind-run, a method suited for standstill, and a method suited for negative wind-run), as shown in FIG. 5. Alternatively, the start-up motor control method may adapt a motor control method based on the detected rotor characteristics or by applying the characteristics as opposed to selecting from among a plurality of different motor control methods.

A number of different embodiments of the high frequency injection methodology along with their implementation will be described in detail. The various embodiments of the high frequency injection method can provide a robust starting method for a PMSM that operates utilizing closed loop control from a standstill condition (e.g., zero speed or low speed).

FIG. 5 shows a diagram that shows exemplary fan starting conditions and fan starting processes. The horizontal axis shows time, t, and the vertical axis shows motor speed, co. The diagram shows three motor speed zones:
 1. Standstill zone: $-\omega_1$ to $\omega_1$—motor speed is zero or within a range close to zero. For example, –10 RPM to 10 RPM.
 2. Wind-run zone: $-\omega_1$ to $-\omega_2$ and $\omega_1$ to $\omega_2$—motor speed is outside the standstill zone, but below operational zone. For example, 10 RPM to 300 RPM and –10 RPM to –300 RPM.
 3. Operational zone: $>\omega_2$—motor speed is above the wind-run speed range where the motor is running under stable speed control. For example, 300 RPM or greater.

Based on these exemplary motor speed zones, different motor starting procedures can be defined. The motor controller can be configured to ramp the motor speed to a target speed in the operational zone depending on the initial motor speed. For example, the motor controller can control the motor differently according to which of the following three initial motor speed cases are detected.
 1. Wind-run positive case: If the starting motor speed is in the positive wind-run zone, for example due to natural wind action, the motor controller can control the motor, e.g., utilizing closed loop control 21, to ramp the motor speed from the wind-run zone to a target or destination speed within the operational zone.
 2. Standstill case: If the motor speed is within the standstill range, e.g., between –10 RPM to 10 RPM, the motor controller can initiate a standstill starting procedure including activating closed loop control 22 to ramp the motor speed from the standstill zone to a target or destination speed within the operational zone. To the extent the rotor is moving in the standstill case, it may be due to natural wind action.
 3. Wind-run negative case: If the motor is within the negative wind-run speed range, e.g., less than –10 RPM, the motor controller can initiate closed loop control 23, ramping down from the negative wind-run speed range toward standstill speed range, through the standstill speed range, then continuing to ramp to a target or destination speed within the operational speed range.

The motor controller can also be configured to ramp to operational speed within a specified starting time period, $T_{st}$ 24. The starting time $T_{st}$ can be limited to a short timing frame, such as 10 or 20 seconds. The motor controller can ramp to a target speed in the operational zone regardless of the initial motor speed being in any of the speed zones. A sensorless permanent magnet synchronous motor control system can operate according to this start-up method to ensure the various initial condition are handled appropriately.

The terms observer (e.g., closed-loop observer), estimator (e.g., open-loop estimator), model (e.g., motor model, rotor model, or stator model), and any other functional modules described herein designate parts of controller 444 or control system 224. Aspects of these functional modules may be stored in memory of the controller 444, and may also form part of the controller configuration such that they are part of the controller 444 that is configured to operate, receive, and translate one or more inputs and to output one or more outputs. That is, these various modules can form part of the controller 444 configuration such that the controller 444 is configured to receive one or more inputs from sensing circuitry in conjunction an embodiment of a rotor characteristic detection method and output one or more driving commands associated with a motor control method to the driving circuitry for the motor.

Figure 6:
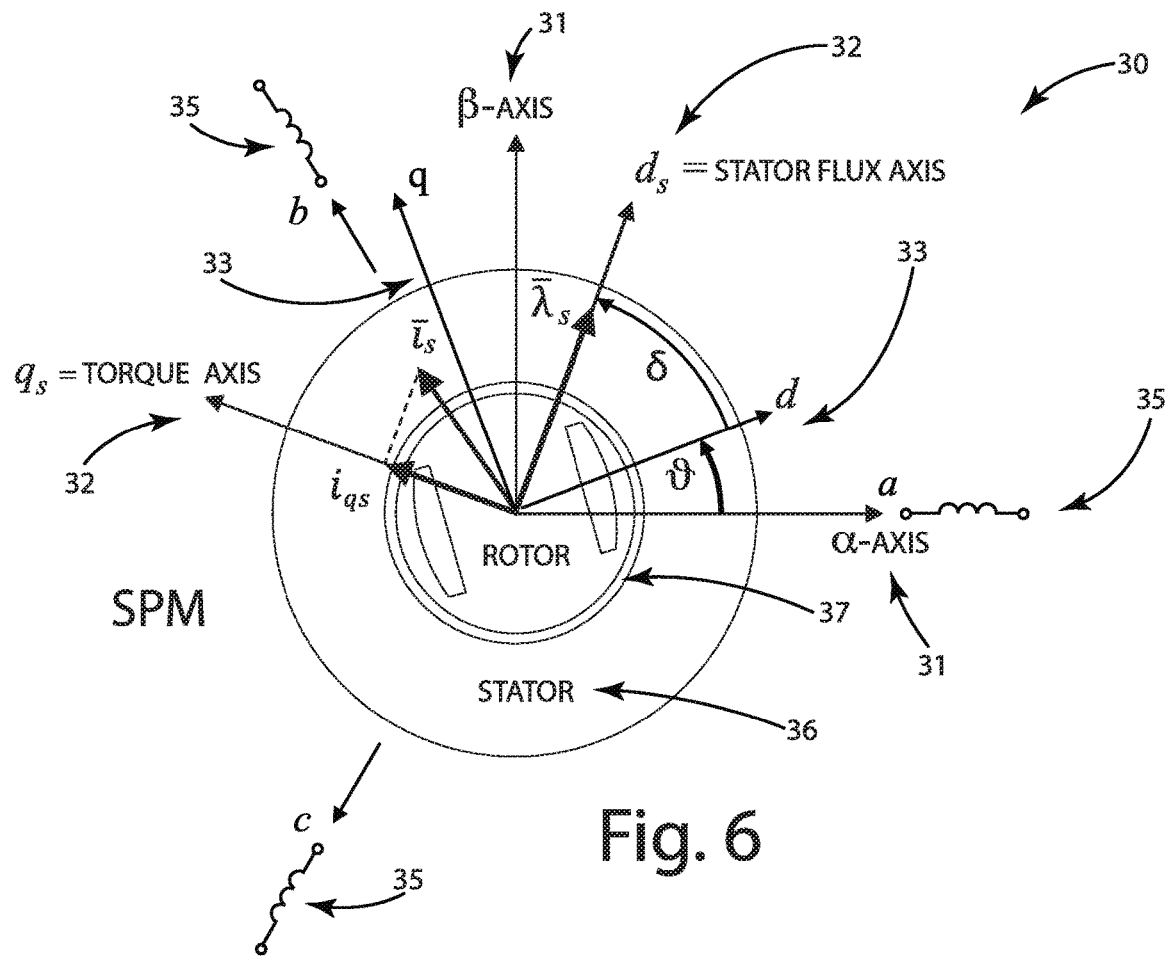
FIG. 6 illustrates reference axes for a PMSM.

The adopted vector reference frames 30 are defined in FIG. 6, for a generic radial interior PMSM motor. The stator 36 includes three-phase windings (a-b-c) 35, if powered on, carrying three-phase currents respectively ($i_a$, $i_b$, $i_c$); these can be transformed into the stationary frame ($\alpha$-$\beta$), 31. The rotor 37 rotating at a synchronous speed can be in a saliency structure, resulting in different permeabilities and inductances between the pole central line d-axis and the perpendicular line q-axis, referenced together as the synchronous rotor frame (d-q axis) 33. For example, the rotor structure of rotor 37 is a two pole rotor design in order to ease explanation. However, the various embodiments are not limited to rotors with two poles, the high frequency injection and polarity detection can be utilized in connection with essentially any motor that has a magnetic saliency structure, including rotors that have other numbers of poles, such as the embodiment of FIG. 2, which illustrates a rotor with 10 poles.

Therefore, the rotor position detection method estimates the position of the d-axis $\vartheta$. Stator three-phase windings ($i_a$, $i_b$, $i_c$) generate a rotating magnetic field at the synchronous speed or stator flux vector $\bar{i}$ on the reference frame of stator flux $d_s$-axis versus torque $q_s$-axis ($d_s$-$q_s$) 32. The subscript "s" used for the vectors refers to the stator flux reference frame. Both the d-q axis representing the rotor position and $d_s$-$q_s$ axis representing the stator flux position rotating at the synchronous speed with an angle referred to as the torque angle.

Generally, for PMSM motors, there are two ways to generate the saliency characteristic, the first way is to create the saliency through the motor rotor structure design, making the rotor structure having different permeabilities on the d- and q-axis flux path, typically, $L_q > L_d$, such as is the case with interior PMSM motors. The second way is to create the saliency by increasing the saturation on the d- and q-axis flux path, resulting in different permeabilities. Generally, any PMSM motor with a significant difference between $L_q$ and $L_d$ (e.g., $L_q$ greater than $L_d$ by 5% or more) provides a meaningful signal and can serve as a sensor to detect rotor position and estimate speed. In the current embodiments, which relate to interior PMSM motors, the motor rotor structure design provides magnetic saliency that is sufficient to detect rotor position and estimate speed.

I. High Frequency Injection

It is well known that by injecting a high frequency signal into the stator windings, the rotor position and rotor speed can be determined without external sensors. In general, this method works by injecting the high frequency signal into the stator, monitoring the stator current based on a mathematical model of the motor, and adjusting the high frequency injection signal until the rotor position is determined.

For surface mounted permanent magnet motors, the effective air gap in the magnetic flux path of $L_d$ and $L_q$ are the same. The permanent magnets have low permeability that can essentially be treated as air in inductance calculations, which means $L_d$ is the same as $L_q$ and a surface mounted permanent magnet motor has low inductance saliency, i.e., the inductance value measured at the stator is constant regardless of the position of the rotor. In contrast, as shown in FIG. 6, for an interior permanent magnet motor the magnets are embedded inside the rotor material (e.g., iron or steel) and since the permanent magnets have lower permeability, the effective air gap in the magnetic flux path varies according to rotor position. This is referred to as magnetic saliency and it causes variation in the inductance at the stator based on rotor position.

The basic concept of high frequency signal injection method is that when a high frequency injection voltage is injected into an IPMSM through the d-axis with the rotor position as depicted in FIG. 6, the measured current will be at the highest level because the flux path has the lowest inductance by virtue of passing through the rotor's permanent magnets. This means that motor impedance is at its minimum value. When a high frequency voltage is injected into the motor through the q-axis while the rotor magnets are in the same position, the measured current is at its lowest level and the motor impedance at maximum by virtue of not passing through any of the rotor's permanent magnets. This means that the position of the rotor magnetic poles can be detected by using the saliency characteristics of the motor.

For example, upon starting, assuming a motor controller does not know the actual position of the magnetic poles created by the rotor permanent magnets (i.e., rotor position is unknown). An arbitrary axis can be presumed by the controller and defined as the d-axis (See FIG. 6), sometimes referred to as the assumed magnetic pole axis. A high frequency voltage signal is then injected on the assumed d-axis to track the actual magnetic pole position through stator current measurements. The high frequency injection generates a high speed rotating field that has a rotating direction assigned by virtue of the injection signal.

A basic high frequency injection mathematical model can be utilized in connection with a HFI startup method to determine an estimated rotor position. A motor controller can be configured to inject signals according to a HFI motor model to determine rotor position and/or rotor speed. A HFI motor model will now be discussed in more detail.

A sensorless IPM motor's magnetic model for high frequency injection is described in connection with a motor rotor frame of reference (direct axis, d and quadrature axis, q) as shown in FIG. 6.

$$\begin{bmatrix} \lambda_{dh} \\ \lambda_{qh} \end{bmatrix} = \begin{bmatrix} L_{dh} & L_{dqh} \\ L_{qdh} & L_{qh} \end{bmatrix} \cdot \begin{bmatrix} i_{dh} \\ i_{qh} \end{bmatrix} \quad (1)$$

$L_{dh}$, $L_{qh}$, $L_{dqh} = L_{qdh}$ are differential inductances corresponding to the operating point in the (d,q) plane 33, as shown in FIG. 6.

The average and difference inductances corresponding to the inductances from magnetic model (1) can be defined as:

$$L_{avgh} = \frac{L_{dh} + L_{qh}}{2}, L_{\Delta h} = \frac{L_{qh} - L_{dh}}{2} \quad (2)$$

With the complex notation and using the complex conjugate current vector $\bar{i}^*_{hf} = i_{dh} - j i_{gh}$, the high frequency magnetic model (1) becomes:

$$\bar{\lambda}_{dqh} = L_{avgh} \cdot \bar{i}_{dqh} + (L_{\Delta h} + j \cdot L_{dqh}) \cdot \bar{i}^*_{dqh} \quad (3)$$

The new expression of the magnetic model (3) emphasizes the contributions of positive and negative sequence current components. It can be noted that the negative sequence current vector is rotated by an angle defined as:

$$\varepsilon = \tan^{-1} \frac{L_{dq}}{L_{\Delta h}}$$

The inverse HF magnetic model flux-to-current [1] is obtained from (3) as $$\bar{i}_{dqh} = \frac{L_{avgh}}{\Delta} \bar{\lambda}_{dqh} - \left( \frac{L_{\Delta h}}{\Delta} + j \cdot \frac{L_{dqh}}{\Delta} \right) \cdot \bar{\lambda}^*_{dqh} \quad (4)$$

Where $$\Delta = \begin{vmatrix} L_{dh} & L_{dqh} \\ L_{dqh} & L_{qh} \end{vmatrix} = L_{dh} \cdot L_{qh} - L_{dqh}^2$$

When a sinusoidal high frequency voltage is superimposed on the fundamental voltage, sinusoidal high frequency currents appear in the motor windings, according to the high frequency motor model. The high frequency currents contain information related to the rotor position that can be extracted with a demodulation scheme and subsequently applied to a tracking observer.

The inverse magnetic model (4) can be transformed into a stationary frame of reference $(\alpha, \beta)$ 31, as shown in FIG. 6. Using the rotational transformations:

$$\bar{i}_{dqh} = e^{-j\vartheta} \cdot \bar{i}_{\alpha\beta h}, \bar{\lambda}_{dqh} = e^{-j\vartheta} \cdot \bar{\lambda}_{\alpha\beta h} \text{ and } \bar{\lambda}^*_{dqh} = e^{j\vartheta} \cdot \bar{\lambda}^*_{\alpha\beta h},$$

the magnetic model (4) becomes, $$\bar{i}_{\alpha\beta h} = \frac{L_{avgh}}{\Delta} \bar{\lambda}_{\alpha\beta h} - \left( \frac{L_{\Delta h}}{\Delta} + j \cdot \frac{L_{dqh}}{\Delta} \right) \cdot e^{j2\vartheta} \bar{\lambda}^*_{\alpha\beta h} \quad (5)$$

Where, $\vartheta$ is the electrical rotor position 33 in FIG. 6.

A method of high frequency injection with a pulsating carrier is provided. In one embodiment, a high frequency injection method with a pulsating carrier uses a pulsating voltage vector that is superimposed on an estimated d-axis voltage component at a constant carrier frequency $\omega_h$ (rad/s), e.g., $$v_{dh} = V_h \cdot \cos(\omega_h t)$$

$$v_{qh} = 0 \tag{9}$$

The corresponding high frequency current vector components in the estimated $(\hat{d}, \hat{q})$ rotor reference frame are:

$$\hat{i}_{dh} = \frac{V_h}{\omega_h} \cdot \left[ \frac{L_{avgh}}{\Delta} + \frac{L_{\Delta h}}{\Delta} \cos(2\vartheta_{err}) - \frac{L_{dqh}}{\Delta} \sin(2\vartheta_{err}) \right] \sin(\omega_h t) \tag{10}$$

$$\hat{i}_{qh} = \frac{V_h}{\omega_h} \cdot \left[ \frac{L_{\Delta h}}{\Delta} \sin(2\vartheta_{err}) + \frac{L_{dqh}}{\Delta} \cos(2\vartheta_{err}) \right] \sin(\omega_h t)$$

where $\vartheta_{err} = \vartheta - \hat{\vartheta}$ is the angle error between the real (d,q) rotor frame and the estimated $(\hat{d}, \hat{q})$ frame.

Equation (10) shows that the amplitude of the estimated q-axis high frequency current component contains information on the position error, so it can be extracted by the sensorless method. The q-axis high frequency component should be zero at steady-state operation in case of perfect estimation of the rotor position. Accordingly, the high frequency injection enables the detection of both angle position and speed based on the assigned direction for closed loop control.

II. Rotor Magnet Polarity Detection with Pulse Injection

The HFI method with pulsating carrier described previously has an uncertainty of 180 electrical degrees in the tracking of the motor d-axis and detects an error that becomes zero two times over one electrical period. That is, the HFI method can determine the rotor position in terms of the position of the magnets relative to the stator, but cannot determine the polarity of the permanent magnets. For example, with reference to FIGS. 7A-B, the HFI method can determine the permanent magnets are positioned as shown in FIGS. 7A and 7B, however, the method cannot distinguish the polarity of the magnets and hence cannot distinguish between the two different rotor positions. This is because the HFI method relies on magnetic saliency, which is the same along the d-axis, regardless of which permanent magnet is the north pole magnet and which is the south pole magnet.

Accordingly, two possible situations may occur, as shown in FIGS. 7A-B. In the first case, the HFI position detection method detects the motor d-axis (positive). In this circumstance, the rotor's actual main flux axis 41, the rotor's estimated main flux axis 42 and rotor magnet flux linkage vector position 43 are all aligned together in FIG. 7A. In the second case, the HFI method detects the negative d-axis. Referring to FIG. 7B, the rotor's actual main flux axis 44 and rotor magnet flux linkage vector position 46 are aligned, but the rotor's estimated main flux axis is 45, 180 degrees different from the actual main flux axis 44.

Therefore, after the execution of the HFI method, an additional test is needed to identify if the detected axis is the positive d-axis (FIG. 7A) or the negative d-axis (FIG. 7B), i.e., to detect the magnet polarity.

A special voltage waveform can be utilized as a detecting profile to execute the polarity detection. In one embodiment, the waveform includes two voltage pulses, $+V_{pulse}$ and $-V_{pulse}$ that are 180 degrees out of phase—that is the second voltage pulse waveform is shifted in time equal to half its period. FIG. 8 illustrates the two voltage pulses with a certain amplitude $V_{pulse}$, 51 and time $t_{pulse}$ length, 52 on the detected axis and on the negative detected axis, the distance is the motor rotor pole span length 53.

Assuming low speed range (−10−+10 RPM) or no rotor movement, the detected d-axis voltage equation is, $$\hat{v}_d = R_s \cdot \hat{i}_d + \frac{d\hat{\lambda}_d}{dt} \Rightarrow \hat{\lambda}_d = \int (\hat{v}_d - R_s \cdot \hat{i}_d) dt + \lambda_m \tag{11}$$

Neglecting the voltage drop on the stator resistance, then (11) becomes, $$\hat{\lambda}_d - \lambda_m = \int \hat{v}_d dt \tag{12}$$

The d-axis voltage includes two voltage pulses 54 of identical volt-seconds defined as shown in FIG. 8.

$$A = \int \hat{v}_d dt = V_{pulse} \cdot t_{pulse} \tag{13}$$

Motor saturation can be detected due when a positive current (and thus Magnetic Motivation Force MMF) is created along the positive d-axis due to the magnets, as shown in FIGS. 9A-B.

One of the pulses aligns with the direction of the magnet flux, thus increasing the magnetization of the stator iron and driving the direct axis inductance $L_d$ into saturation, as shown in FIG. 9A. As a current builds up in the direction of applied voltage pulse, the value of the direct axis inductance $L_d$ 61 reduces.

The other current pulse opposes the direction of the magnet flux. This will de-saturate the stator iron and the direct axis inductance $L_d$ 62 will increase as shown in FIG. 9B.

The volt-second values of the injected voltage pulses being identical, the amplitudes of the current pulses will differ, as shown in FIG. 10A or FIG. 10B. Where $I_{pulse1} > I_{pulse2}$, as shown in FIG. 10A, the positive direction of the rotor axis, i.e., the correct magnet polarity 72 in FIG. 10A shows that the estimated $\hat{q}$-axis overlaps the real q-axis. The two possible situations are summarized in FIGS. 10A-D.

In first case, depicted in connection with FIGS. 10A-B, the first current pulse 71 is higher than the second one 72, so the HFI method provides the correct estimated rotor position that matches the actual rotor position, 73 and 74. In the second case, depicted in connection with FIGS. 10C-D, the second pulse 76 is larger than the first one 75, so the HFI method has provided the negative magnet polarity (negative d-axis). As a result, the position provided by the HFI method must be corrected with 180 electrical degrees 77 and 78. Accordingly, the polarity detection method is able to distinguish the position of the rotor with respect to the poles of the magnets.

III. Tracking Observer

Figure 11:
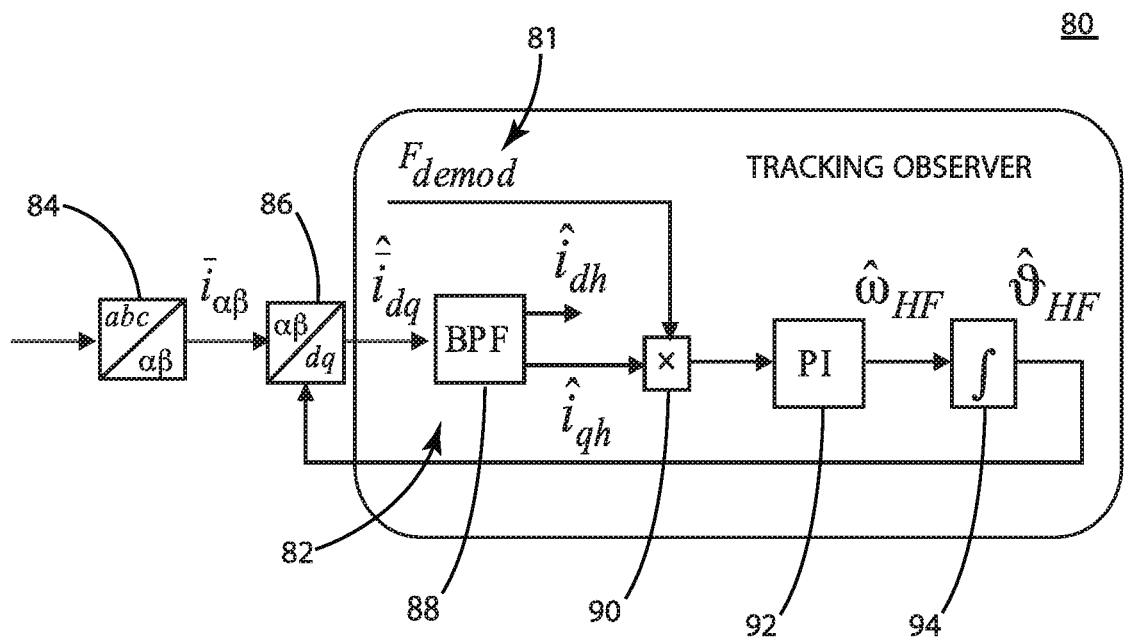
FIG. 11 illustrates one embodiment of a tracking observer scheme diagram.

One embodiment of a tracking observer is presented in FIG. 11, operating in an estimated rotor frame $(\hat{d}, \hat{q})$ based on the (d,q) axis frame in FIG. 6. This tracking observer can be implemented in controller 444, elsewhere in the motor control system 224, or a separate controller in communication with the system.

FIG. 11 depicts a block diagram that shows one embodiment of a tracking observer 80. In the depicted embodiment, the measured three phase current or currents ($i_a$, $i_b$, $i_c$) from the sensing circuitry 442 are input to a stationary frame transformation function 84 to transform the three phase currents to the stationary frame of reference $(\alpha, \beta)$ 31, which in turn can be input to a d-q frame transformation function 86 to transform the sensed stationary frame currents to the d-q frame of reference 33 for input to the tracking observer 80. In alternative embodiments, the currents may be transformed directly to the d-q frame, or the currents may be input in the tracking observer using a different frame of reference.

The resultant sensed current in the d-q frame, $i_{dq}$ is input to the tracking observer 80 and passed through a band-pass filter 88, which extracts the injected high frequency components from the $(\hat{d},\hat{q})$ current components. Specifically, at startup the fundamental frequency is zero, so the filter can be inactive. When the rotor runs at a low speed, such as a few RPM due to the wind-run, this filter will be activated to acquire the position at a slow movement of rotor, $i_{dh}$ and $i_{qh}$.

Figure 14:
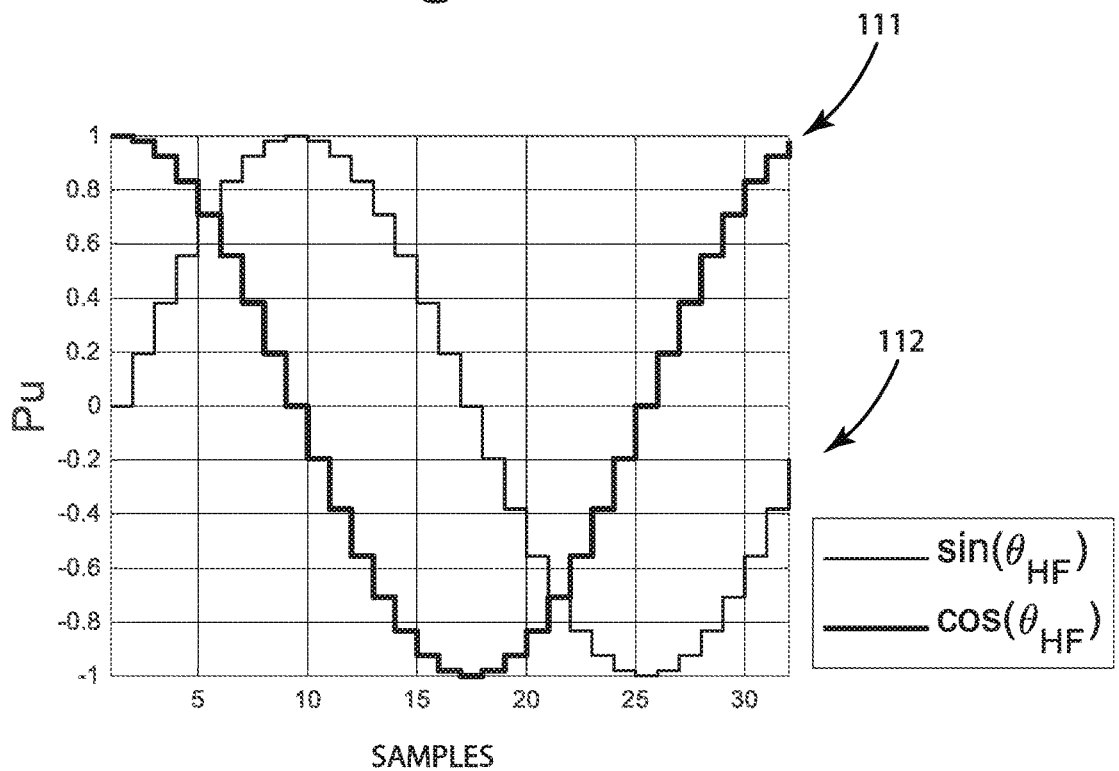
FIG. 14 illustrates generation of sampling functions using a Look-Up-Table with 32 samples.

The $i_{qh}$ current is demodulated according to a demodulation function 90 using a demodulation frequency $F_{demod}$ 81. The resulting demodulated signal includes a current component that contains the error between the real rotor position and the estimated rotor position; the resulting signal $\varepsilon_{HF}$ (tracking loop error) is applied to a PI controller 92 whose output is the estimated rotor speed $\hat{\omega}_{HF}$. One embodiment of the functionality of a PI controller is depicted in FIG. 14. The estimated speed is input to an integrator 94 to obtain the estimated rotor position $\hat{\vartheta}_{HF}$.

The controller 444 can be configured to select an injection frequency and voltage amplitude. In one embodiment, the injected frequency is sufficiently high to obtain a fast response (e.g., less than 200 milliseconds) and to reduce the sensitivity to the stator resistance. For example, practical values of the injected frequency include between 500 Hz-1 kHz, though values outside of that range can be effective.

The high frequency voltage amplitude can be selected to obtain a certain high frequency amplitude of the currents. At high frequency, the stator resistance can be neglected. Assuming perfect orientation with $v_{dh}=V_h\cdot\cos(\omega_h t)$, $v_{qh}=0$, the peak value of the high frequency d-axis current can be approximated as $$\hat{i}_{dh} \cong \frac{V_h}{X_{dh}} = \frac{V_h}{\omega_h L_{dh}} = \frac{V_h}{2\pi f_h L_{dh}} \quad (14)$$

The controller is configured with an injected voltage $V_h$ that provides an amplitude of the d-axis high frequency current in the range 0.3-0.5 A, which provides a reasonable signal-to-noise ratio. For example, an injected voltage of −50V-+50V is a practical value for some applications.

The demodulation function can be defined as $$F_{demod} = \frac{\omega_h}{V_h} \cdot \frac{\Delta}{L_{\Delta h}} \cdot \sin(\omega_h t) = \hat{F}_{demod} \cdot \sin(\omega_h t) = \quad (15)$$

$$\frac{2 \cdot L_{dh} \cdot L_{qh}}{L_{qh} - L_{dh}} \cdot \frac{\omega_h}{V_h} \cdot \sin(\omega_h t) = k_{Fmod} \cdot \frac{\omega_h}{V_h} \cdot \sin(\omega_h t)$$

where $k_{Fmod} = \frac{2 \cdot L_{dh} \cdot L_{qh}}{L_{qh} - L_{dh}}$.

If the demodulation function (15) is applied to the high frequency estimated q-axis component given by (10), the input of the PI controller (error of the HF tracking loop) becomes $$\Delta\gamma_{HF} = \left[\sin(2\vartheta_{err}) + \frac{L_{dqh}}{L_{\Delta h}}\cos(2\vartheta_{err})\right]\cdot\sin^2(\omega_h t) = \quad (16)$$

$$\frac{\sin[2\vartheta_{err} + \gamma]}{\cos\gamma}\cdot\sin^2(\omega_h t)$$

where $\gamma = a\tan\left(\frac{L_{dqh}}{L_{\Delta h}}\right)$

The starting is done at no-load, so the cross-saturation inductance $L_{dqh}$ can be neglected. As a result, the (16) can be simplified as $$\Delta\gamma_{HF} \cong \sin(2\vartheta_{err})\cdot\sin^2(\omega_h t) = \sin(2\vartheta_{err})\cdot\left[\frac{1}{2} - \frac{\cos(2\omega_h t)}{2}\right] \quad (17)$$

For small orientation errors, we can assume that $\sin(2\vartheta_{err}) \cong 2\vartheta_{err}$ and for this reason the tracking loop error that is applied to the PI controller is $$\Delta\gamma_{HF} \cong 2\vartheta_{err}\cdot\left[\frac{1}{2} - \frac{\cos(2\omega_h t)}{2}\right] = \vartheta_{err}\cdot[1 - \cos(2\omega_h t)] \quad (18)$$

The high frequency component $\cos(2\omega_h t)$ should be far higher than the bandwidth of the PI controller. Therefore, the effective tracking loop error is the error between the real position and the estimated position since the PI controller will act as a low pass filter (LPF) for the high frequency component $\cos(2\omega_h t)$.

$$\text{LPF}(\Delta\gamma_{HF}) \cong \vartheta_{err} \quad (19)$$

As can be noted from (15), the peak value $\hat{F}_{demod}$ of the demodulation function depends on the motor parameters.

Figure 12:
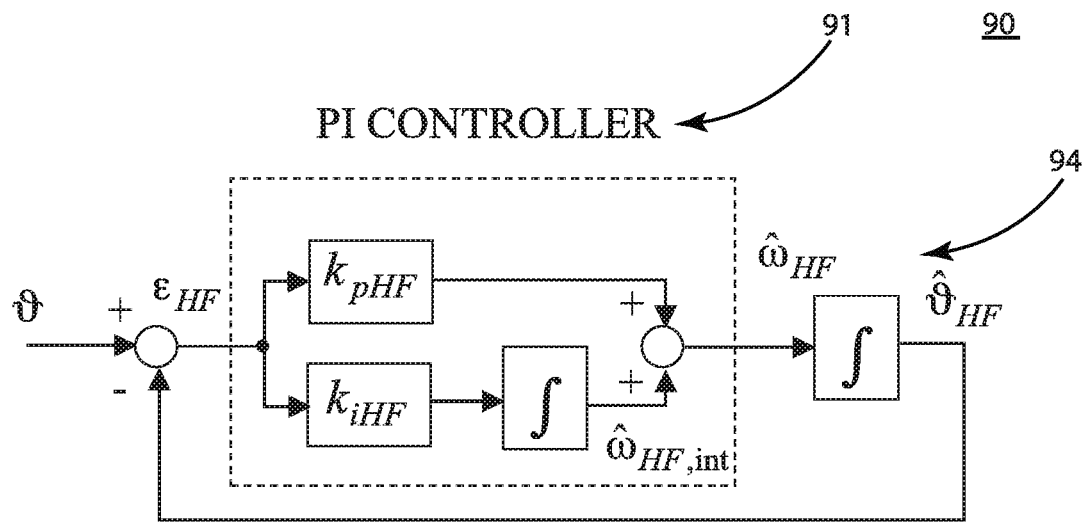
FIG. 12 illustrates a tracking loop Phase-Locked Loop PLL showing the PI controller and integral function.

As demonstrated by (17,18), the tracking loop controller error is the error between the real rotor position and the estimated rotor position. Therefore, the tracking loop is equivalent with a phase lock loop (PLL) scheme, as shown in FIG. 12.

The open-loop transfer function of the tracking loop PLL is $$H_{OL}(s) = H_{PI}(s)\cdot\frac{1}{s} = \left(k_{p,HF} + \frac{k_{i,HF}}{s}\right)\cdot\frac{1}{s} = \frac{k_{p,HF}}{s^2}\cdot(s + \omega_{zHF}) \quad (20)$$

where $k_{p,HF}$ is the proportional PI gain, $k_{i,HF}$ is the integral PI gain and $$\omega_{zHF} = \frac{k_{i,HF}}{k_{p,HF}}$$

is the regulator zero.

Figure 13:
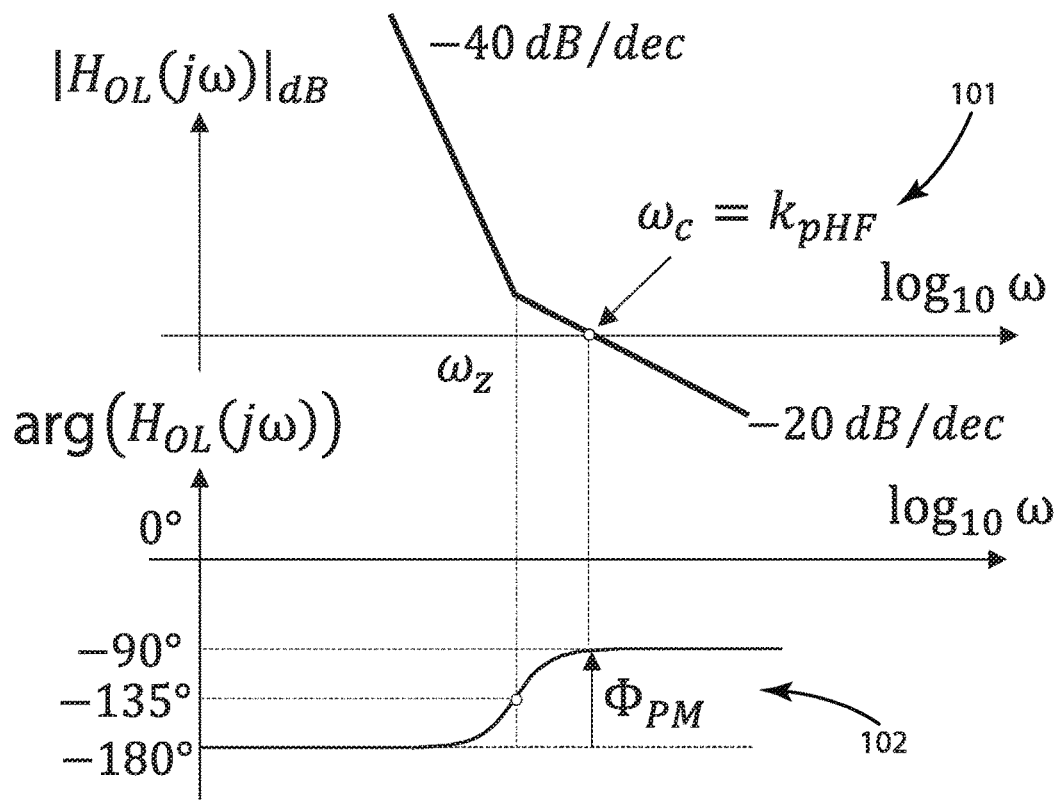
FIG. 13 illustrates Bode plots of the open-loop transfer function of the tracking loop of FIG. 12.

Bode plots of the $H_{OL}(s)$ are shown in FIG. 13. The crossover frequency $\omega_{cHF}$ (close to the bandwidth $\omega_{bwHF}$ for closed-loop operation) is equal with the proportional gain, while the phase margin is directly related to the phase margin $\Phi_{PM, HF}$, 102 according to (21)

$$\begin{cases} \omega_{bwHF} \cong \omega_{cHF} = k_{p,HF} \\ \tan(\Phi_{PM,HF}) = \frac{\omega_{cHF}}{\omega_{zHF}} \end{cases} \quad (21)$$

A PI controller can be configured according to the following steps:

1. Impose a desired bandwidth $\omega_{bwHF}$ (rad/s) of the tracking loop $$k_{p,HF} = \omega_{bwHF}(\text{rad/s}) \quad (22)$$

2. Impose a desired phase margin $\Phi_{PM,HF,deg}$ (degrees) of the tracking loop $$k_{i,HF} = \frac{k_{p,HF}^2}{\tan(\Phi_{PM,HF,deg}\frac{\pi}{180})} \text{(rad/s}^2\text{)} \quad (23)$$

To avoid overshoots, the phase margin can be set within a certain range of degrees, such as 70-80 degrees. The selection of the bandwidth is related to the response time and to the injected high frequency signal. A practical phase margin can be in the range $$\left(\frac{1}{20}, \frac{1}{10}\right)$$

of the injected frequency.

The selection of the pulse injection voltage and time for magnet polarity detection can be selected to obtain deep saturation on the positive d-axis. The current pulses of values can be equal or higher than the motor rated peak values. The values can be automatically selected based on the variation of the d-axis flux versus d-axis current (direct magnetic model on the d-axis). Alternatively, the pulse injection voltage and time for magnet polarity detection can be selected using a trial-and-error approach.

IV. HFI w/Polarity Detection Numerical Example

The frequency of the high frequency injection signal can be selected as a submultiple of the sampling frequency. This allows the generation of the $\cos(\omega_h t)$ used in (9) to be performed synchronously with the sampling frequency. In addition, the submultiple number can be an even number. In one exemplary embodiment, the selected injection frequency for a motor under test (MUT) is 500 Hz, i.e., 32 samples for one high frequency period. The trigonometric functions are generated in the control routine using precalculated Look-Up Tables (LUT), as shown in FIGS. 14, 111 and 112.

Referring to FIG. 12, generation of $\sin(\omega_h t)$, $\cos(\omega_h t)$ using LUT with 32 samples.

In the exemplary embodiment, the MUT is a sensorless permanent magnet synchronous motor with the inductances:

$L_{dh}$=36 mH $L_{qh}$=45.3 mH  (24)

For the injection frequency of 500 Hz, the high frequency d-axis reactance is $X_{dh} = 2 \cdot \pi \cdot f_h \cdot L_{dh} = 2 \cdot \pi \cdot 500 \cdot 0.036 = 113.09 \Omega$  (25)

The MUT stator resistance is 2.33Ω@25° C., so the stator resistance is much smaller than the d-axis HF reactance.

For explanation purposes, the MUT high frequency voltage amplitude can be selected as 50V, so the peak value of the d-axis current is $$\hat{i}_{dh} \cong \frac{V_h}{X_{dh}} = \frac{50}{113,09} = 0.44A \quad (26)$$

By way of example, with an injection frequency of $f_h$=500 Hz using a pulsating voltage of amplitude $V_h$=50V, the peak value of the demodulating function is $$\Delta = L_{dh} \cdot L_{qh} - L_{dqh}^2 \cong L_{dh} \cdot L_{qh} \atop {\cong 0}} \atop L_{\Delta h} = \frac{L_{qh} - L_{dh}}{2} \right\} \Rightarrow \frac{\Delta}{L_{\Delta h}} = \frac{2 \cdot L_{dh} \cdot L_{qh}}{L_{qh} - L_{dh}} \quad (27)$$

$$\hat{F}_{demod} = \frac{\omega_h}{V_h} \cdot \frac{2 \cdot L_{dh} \cdot L_{qh}}{L_{qh} - L_{dh}} = \quad (28)$$

$$\frac{2 \cdot \pi \cdot f_H}{V_h} \cdot \frac{2 \cdot L_{dh} \cdot L_{qh}}{L_{qh} - L_{dh}} = \frac{2 \cdot \pi \cdot 500}{50} \cdot \frac{2 \cdot 36 \cdot 45.3 \cdot 10^{-6}}{(45.3 - 36) \cdot 10^{-3}} = 22.035$$

The (28) can be computed before the motor start and stored in memory within the motor control system 224, such as in a database, variable or look-up table, for real-time calculations in implementation.

The bandwidth of the tracking loop is selected as 25 Hz, while the phase margin is chosen as 80 degrees. The gains of the PI controller of the tracking loop are calculated with (29) and (30) as $$k_{p,HF} = \omega_{bwHF} = 2 \cdot \pi \cdot f_{bw} = 2 \cdot \pi \cdot 25 = 157 \text{ (rad/s)} \quad (29)$$

$$k_{i,HF} = \frac{k_{p,HF}^2}{\tan(\Phi_{PM,HF,deg}\frac{\pi}{180})} = \frac{157^2}{\tan(80\frac{\pi}{180})} = 4350 \text{ (rad/s}^2\text{)} \quad (30)$$

Figure 15A:
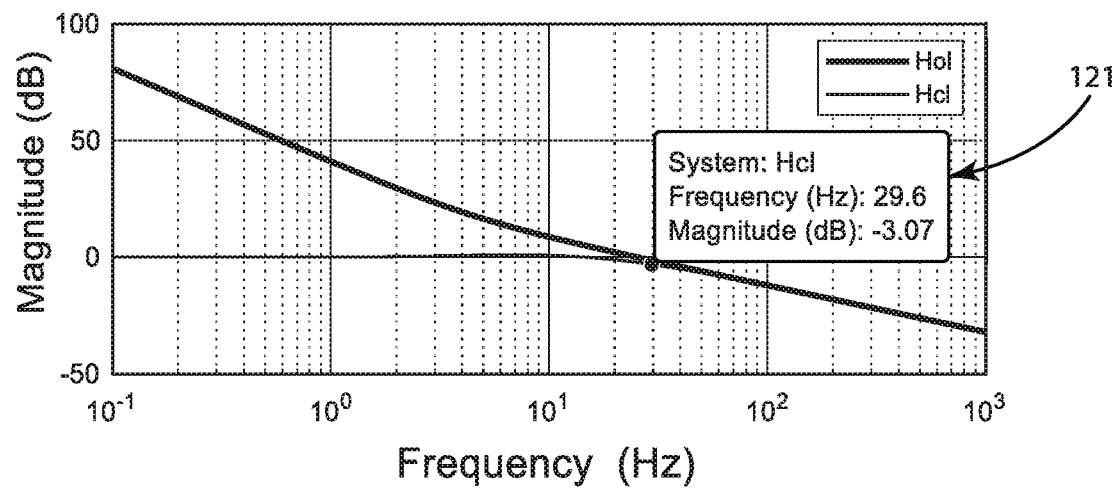
FIGS. 15A-B illustrate open-loop and closed-loop tracking loop Bode diagrams.
Figure 15B:
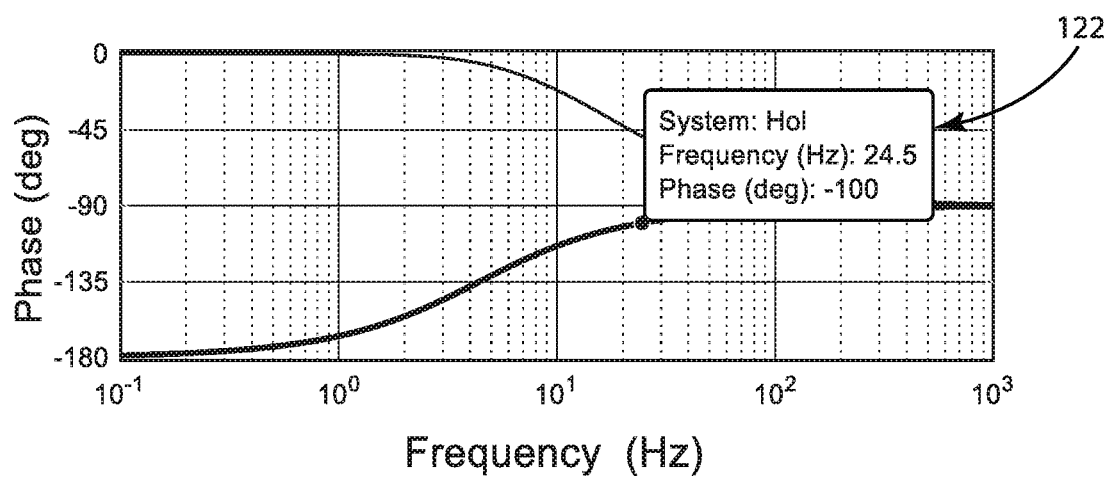

The Bode diagrams of the open loop and closed loop transfer function of the tracking loop are shown in FIGS. 15A-B, where it has been shown the closed loop real bandwidth about 30 Hz, 121 and the phase at 25 Hz for the open-loop transfer function, about −100 degrees, resulting in 80 degrees of phase margin, 122.

For rotor polarity detection, the pulse injection voltage and time can be selected as follows. For the MUT the following values have been chosen ($T_s$ is the sampling time corresponding to 16 kHz):

$$\left. \begin{array}{l} V_{pulse} = 50 \text{ V} \\ t_{pulse} = 30 \cdot T_s = 1.875 \text{ ms} \end{array} \right\} \Rightarrow A = \quad (31)$$

$$\int v_d dt = V_{pulse} \cdot t_{pulse} = 0.093 \text{ (Vs)}$$

The magnets flux of the MUT is $\lambda_m$=0.185 (Vs) (25° C.), so the total volt-seconds applied to the motor is about 50% of the rated magnets flux. This value can be a metric in the selection of the volt-seconds for rotor polarity detection. The additional flux increase depends on the motor magnetic model. As an example, for a different motor than the MUT 100% of flux increase with respect to the magnets flux, in agreement with its magnetic model.

The HFI with alternating carrier method is suitable for use in connection with a 550 W brushless permanent magnet motor equipped with a propeller having 650 mm blades. The effectiveness of the HFI with alternating carrier method is shown in FIGS. 16A-D.

Figure 16A:
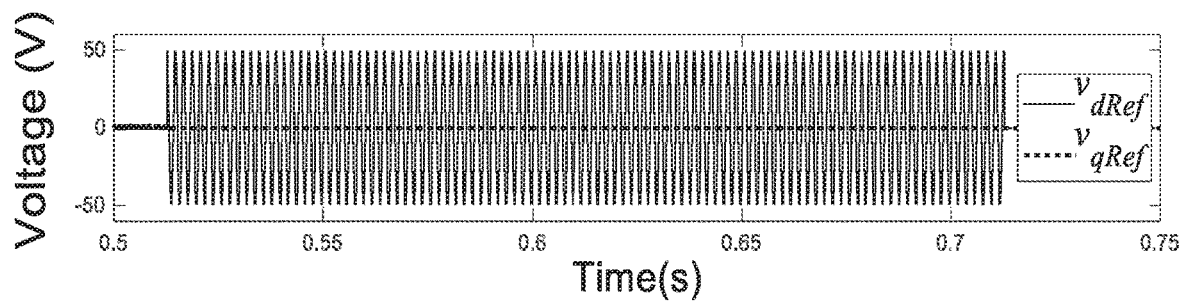
FIGS. 16A-D illustrate exemplary reference voltages in estimated (d-q) frame (V), the currents in the estimated (d-q) frame, the input of the PI controller of the tracking loop, and estimated position over time during High Frequency Injection with alternating carrier.
Figure 16B:
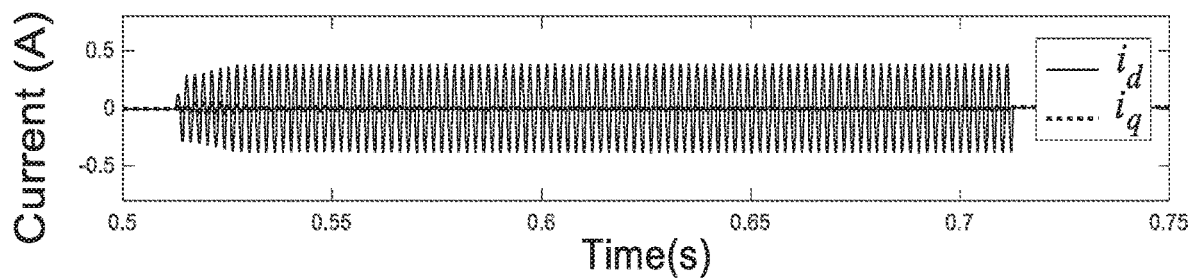
Figure 16C:
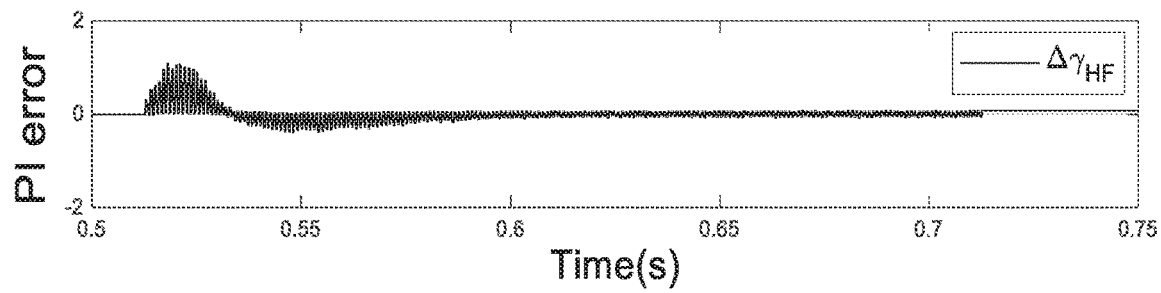
Figure 16D:
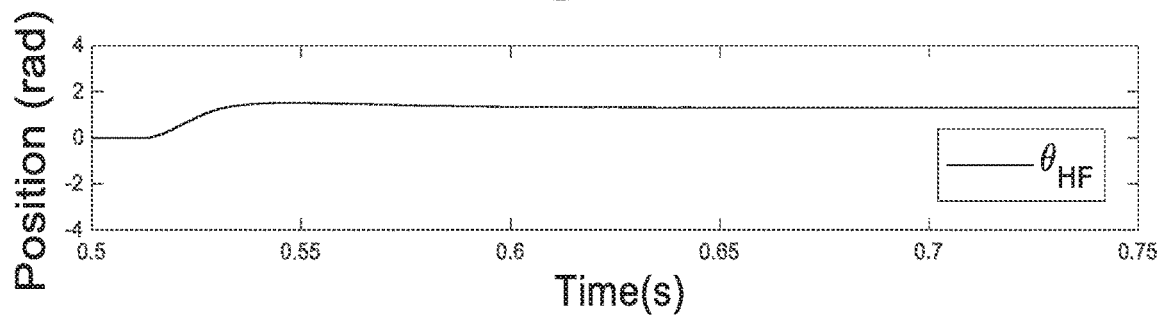

FIG. 16A shows that the injected voltage on the estimated d-axis has a 50V peak value. FIG. 16B shows that the d-axis current peak value is about 0.4 A. FIG. 16C shows the PI error during the injection. Referring to FIG. 16D, the estimated position $\theta_{HF}$ shows a smooth response, with almost no overshoot. Further, the response time is less than 100 ms, although the injection has been set at 200 ms.

Figure 17A:
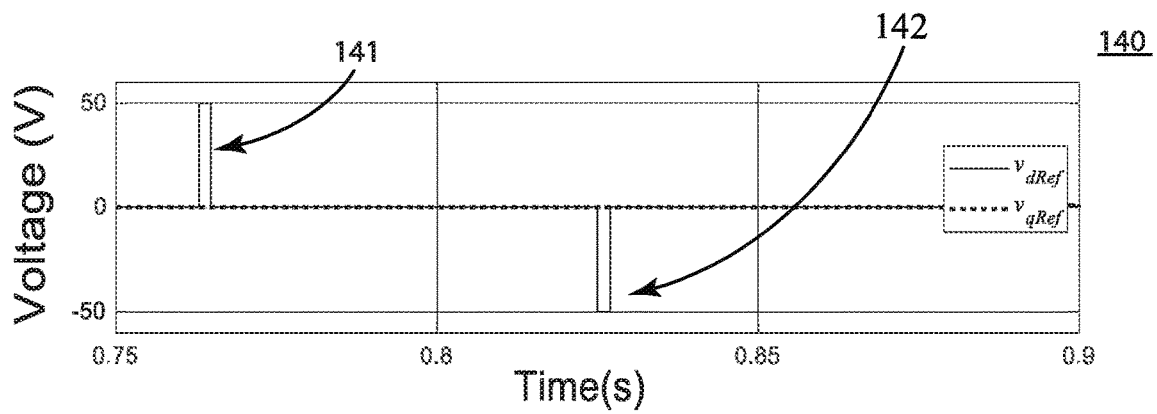
FIGS. 17A-C illustrate rotor polarity detection with two consecutive voltage pulses showing voltage, current, and position correction.
Figure 17B:
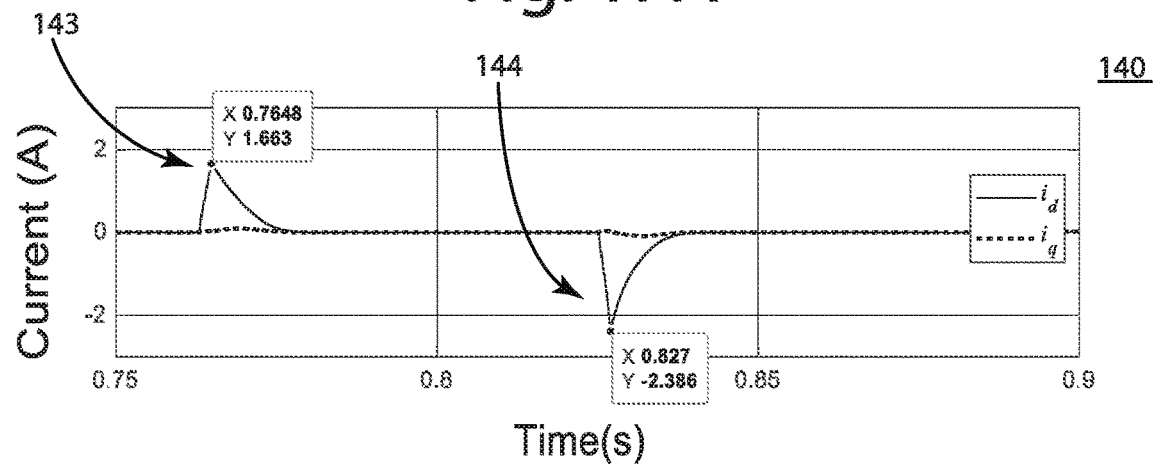

An example of magnet polarity detection is described now. FIG. 17A shows the two voltage pulses 141, 142 imposed with 50V and −50V in amplitude on the estimated d-axis from HFI position detection. Referring to FIG. 17B, the amplitude of the first pulse 143, $I_{pulse1}$ (1.663 A), is lower than the amplitude of the second pulse 144, $I_{pulse2}$ (2.386 A). As a result, the pulse injection has detected the motor rotor is in the negative motor d-axis configuration, as illustrated in FIGS. 10C-10D). Therefore, the flux observer angle is initialized as:

$$\vartheta_{obs}=\vartheta_{HF}+\pi \quad (32)$$

Figure 17C:
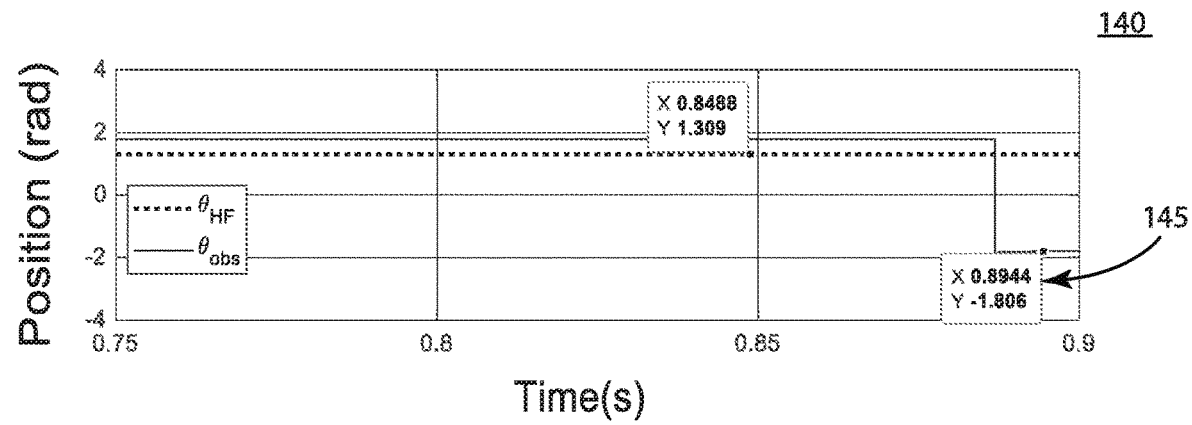

In FIG. 17C the observer angle 145 appears as negative due to the rollover above π.

Figure 18A:
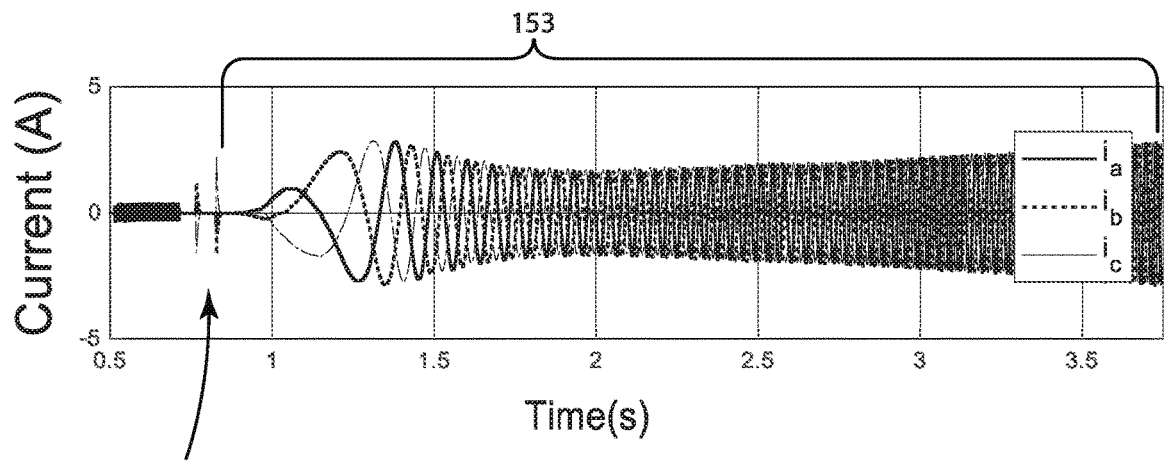
FIGS. 18A-C show a complete starting process including detection of initial rotor position by applying the HFI and two pulses for rotor polarity detection.
Figure 18B:
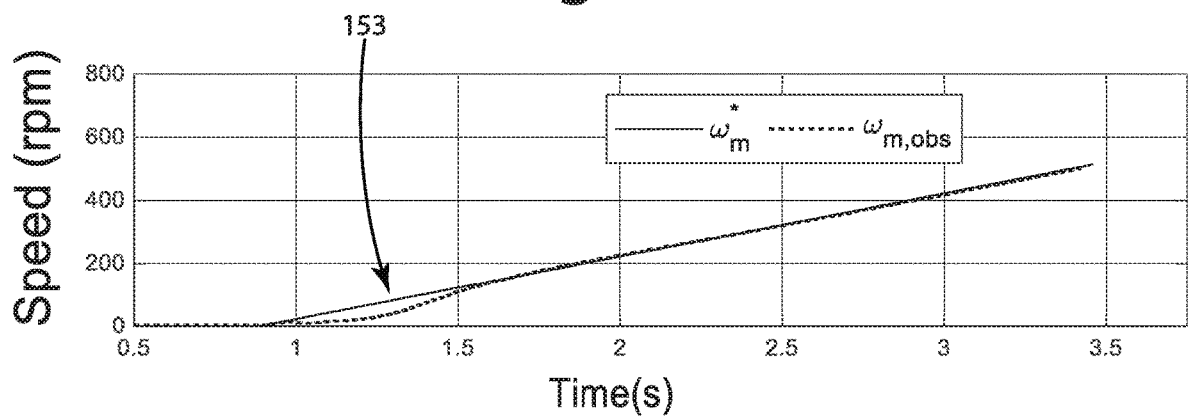
Figure 18C:
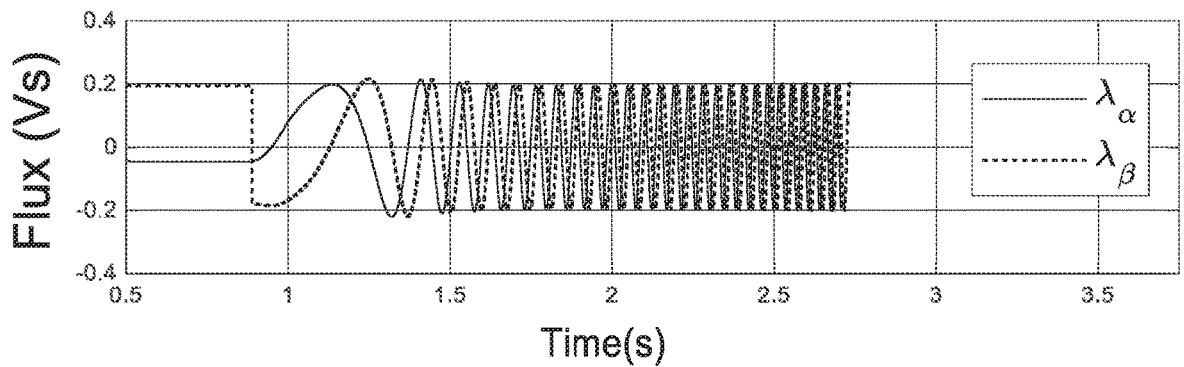

An example of the complete starting procedure with direct engage of the observer from zero speed is shown in FIGS. 18A-C. In FIG. 18A, at starting moment, the HFI 151 is applied to detect the rotor position, which has an identical waveform to the FIG. 16A. Following the initial rotor position being detected, the polarity detection and verification is executed by imposing two voltage pulses 152, as shown in connection with FIGS. 17A-C. After these two steps, the estimated position is acquired, and the close loop control 153 is activated, for example DFC control. FIG. 18B shows how the reference speed and estimated speed curves are close together after close loop control. FIG. 18C shows the two stationary frame of reference fluxes being controlled stably.

The rotor characteristic detection method, including both the high frequency injection for rotor speed and position detection and the pulse injection for rotor polarity detection, can detect characteristics of a BPM motor exhibiting rotor magnetic anisotropy. In particular, the alternating carrier method for detecting rotor magnetic polarity is effective and robust to apply the HFI method. Once the initial position and rotor magnet polarity is detected, the motor controller can start the motor directly from zero speed by being in closed loop control based on the Direct Flux Control (DFC) in speed control.

This HFI method with polarity detection is robust to provide the rotor position in both zero speed and low speed (a few Rpm) of clockwise or counterclockwise rotation. Due to zero or very low speed, the direction does not have a meaningful impact in controlling the motor to rotate along the right direction. Accordingly, the present invention provides a suitable starting process from standstill status in commercial fan applications.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A sensorless interior permanent magnet synchronous motor comprising:
  a motor housing;
  a stator mounted in the motor housing and defining a cylindrical space, the stator having a three-phase stator winding configuration;
  a rotor including a plurality of interior permanent magnets distributed circumferentially such that the rotor exhibits magnetic saliency, the rotor being rotatable inside the cylindrical space;
  a motor control system mounted in the motor housing including:
    a power supply;
    a sensing circuit for sensing one or more electrical characteristics of the stator;
    a controller configured to provide closed loop control at motor startup from a standstill condition, the closed loop control including the controller being configured to detect rotor magnetic polarity based on, at least in part, the one or more electrical characteristics of the stator sensed by the sensing circuit and generate driving commands based on, at least in part, the detected rotor magnetic polarity; and
    a driving circuit for energizing the three-phase stator winding configuration according to the driving commands to operate the motor during startup;
    wherein the controller is configured to detect rotor magnetic polarity by generating driving commands that generate first and second voltage pulses in the three phase stator winding configuration, wherein the sensing circuit is configured to sense a first peak stator current during the first voltage pulse and configured to sense a second peak stator current during the second first voltage pulse, and wherein the controller is configured to detect the rotor magnetic polarity based on a comparison of the first peak stator d-axis current and the second peak stator d-axis current.

2. The sensorless interior permanent magnet synchronous motor of claim 1 wherein the closed loop control includes the controller being configured to detect rotor position according to a signal injection method and wherein the driving commands are based on both the detected rotor magnetic polarity and the rotor position.

3. The sensorless interior permanent magnet synchronous motor of claim 1 wherein the closed loop control includes the controller being configured to detect rotor position and rotor speed according to a signal injection method and wherein the driving commands are based on the detected rotor magnetic polarity, the rotor position, and the rotor speed.

4. The sensorless interior permanent magnet synchronous motor of claim 1 wherein the controller is configured to detect rotor magnetic polarity according to an alternating carrier method.

5. The sensorless interior permanent magnet synchronous motor of claim 1 wherein the first and second voltage pulses have opposite amplitudes, are shifted 180 degrees out of phase with respect to one another, and each produce a magnetic field substantially along a d-axis.

6. The sensorless interior permanent magnet synchronous motor of claim 1 wherein the rotor includes a rotor structure design having ten poles.

7. A sensorless interior permanent magnet synchronous motor comprising:
a motor housing;
a stator mounted in the motor housing and defining a cylindrical space, the stator having a three-phase stator winding configuration;
a rotor including a plurality of interior permanent magnets distributed circumferentially such that the rotor exhibits magnetic saliency, the rotor being rotatable inside the cylindrical space;
a motor control system mounted in the motor housing including:
a power supply;
a sensing circuit for sensing one or more electrical characteristics of the stator;
a controller configured to provide closed loop control at motor startup from a standstill condition, the closed loop control including the controller being configured to detect rotor magnetic polarity based on, at least in part, the one or more electrical characteristics of the stator sensed by the sensing circuit and generate driving commands based on, at least in part, the detected rotor magnetic polarity; and
a driving circuit for energizing the three-phase stator winding configuration according to the driving commands to operate the motor during startup;
wherein the controller is configured to detect rotor magnetic polarity based on a difference in magnetic anisotropy extracted from first and second electrical characteristics of the stator sensed by the sensing circuit in response to the driving circuit energizing the three phase stator winding configuration with two opposite amplitude energy pulses.

8. A sensorless interior permanent magnet synchronous motor comprising:
a motor housing;
a stator mounted in the motor housing and defining a cylindrical space, the stator having a three-phase stator winding configuration;
a rotor including a plurality of interior permanent magnets distributed circumferentially such that the rotor exhibits magnetic saliency, the rotor being rotatable inside the cylindrical space;
a motor control system mounted in the motor housing including:
a power supply;
a sensing circuit for sensing one or more electrical characteristics of the stator;
a controller configured to provide closed loop control at motor startup from a standstill condition, the closed loop control including the controller being configured to detect rotor magnetic polarity based on, at least in part, the one or more electrical characteristics of the stator sensed by the sensing circuit and generate driving commands based on, at least in part, the detected rotor magnetic polarity; and
a driving circuit for energizing the three-phase stator winding configuration according to the driving commands to operate the motor during startup;
wherein the controller is configured to detect rotor magnetic polarity by generating driving commands that generate first and second voltage pulses in the three phase stator winding configuration, wherein the controller is configured to determine a first stator current integral during the first voltage pulse and configured to determine a second stator current integral during the second first voltage pulse, and configured to detect the rotor magnetic polarity based on a comparison of the first stator current integral and the second stator current integral.

9. A rotor characteristic detection method for a sensorless interior permanent magnet synchronous motor having a motor control system, a rotor, a stator, and a motor shaft, the method comprising:
generating a first pulse voltage signal having a first amplitude;
generating a second pulse voltage signal having a second amplitude, opposite the first amplitude;
injecting the first pulse voltage into the stator;
sensing a first stator current response to injecting the first pulse voltage into the stator;
injecting the second pulse voltage into the stator;
sensing a second stator current response to injecting the second pulse voltage into the stator;
comparing the first stator current response and the second stator current response; and
detecting rotor magnetic polarity based, at least in part, on the comparing.

10. The rotor characteristic detection method of claim 9 wherein the stator has a three phase winding configuration capable of generating magnetic field, wherein injecting the first pulse voltage into the stator includes injecting the first pulse voltage along a d-axis with respect to the motor and wherein injecting the second pulse voltage into the stator includes injecting the second pulse voltage along the d-axis.

11. The rotor characteristic detection method of claim 9 wherein the sensing the first stator current response includes sensing a first peak stator phase current during the first voltage pulse and wherein the sensing the second stator current response includes sensing a second peak stator phase current during the second voltage pulse, and wherein the comparing includes comparing the first peak stator phase current and the second peak stator current response to detect whether the rotor is in the first orientation or the second orientation.

12. The rotor characteristic detection method of claim 9 wherein injecting the second pulse voltage into the stator occurs shifted 180 degrees with respect to the first pulse voltage.

13. The rotor characteristic detection method of claim 9 including extracting first magnetic anisotropy information from the first stator current response and extracting second magnetic anisotropy information from the second stator current response, wherein the comparing the first stator current response and the second stator current response includes comparing the first anisotropy information from the first stator current response and the second anisotropy information from the second stator current response.

14. The rotor characteristic detection method of claim 9 wherein detecting rotor magnetic polarity includes detecting whether the rotor is in a first orientation or a second orientation, rotated 180 degrees about the motor shaft.

15. A sensorless start-up method for driving an interior permanent magnet synchronous motor having a motor control system, a rotor, a stator, and a motor shaft, the method comprising:

injecting a high frequency signal into the stator for rotor position estimation;

sensing a stator response to the injecting of the high frequency signal into the stator;

estimating rotor position based on the sensed stator response to the injecting of the high frequency signal into the stator;

injecting first and second pulse voltage signals into the stator for rotor magnetic polarity detection, wherein the pulse voltage signals are injected based on the estimated rotor position;

sensing first and second stator responses to the injecting of the first and second pulse voltage signals into the stator;

determining rotor magnetic polarity based on the sensed stator response to the injecting of the first and second pulse voltage signals into the stator;

controlling the motor speed from a standstill condition based on the estimated rotor position and determined rotor magnetic polarity.

16. The sensorless start-up method of claim 15 wherein the standstill condition includes wind-run between 10 to −10 RPM.

17. The sensorless start-up method of claim 15 wherein the first and second stator responses to injecting the first and second pulse voltage signals into the stator include first and second peak stator phase current signals during the first and second voltage pulses, and wherein determining rotor magnetic polarity includes determining rotor magnetic polarity based on the first and second peak stator phase current signals.

18. The sensorless start-up method of claim 15 wherein injecting the first and second pulse voltage signals into the stator includes injecting the first and second pulse voltage signals shifted 180 degrees.

19. The sensorless start-up method of claim 15 wherein determining rotor magnetic polarity includes determining whether the rotor is in a first orientation or a second orientation, rotated 180 degrees about the motor shaft, and wherein controlling the motor speed from a standstill condition includes controlling the motor speed from a standstill condition based on whether the rotor is in the first orientation or the second orientation.

\* \* \* \* \*